US008190520B1

(12) United States Patent
Hyland

(10) Patent No.: US 8,190,520 B1
(45) Date of Patent: *May 29, 2012

(54) AUDITING AND RECONCILING CUSTODIAL ACCOUNTS

(75) Inventor: Robert Hyland, Clarksburg, MD (US)

(73) Assignee: Promontory Interfinancial Network, LLC, Arlington, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/634,358

(22) Filed: Dec. 9, 2009

Related U.S. Application Data

(63) Continuation of application No. 11/556,662, filed on Nov. 3, 2006, now Pat. No. 7,640,199.

(51) Int. Cl.
*G06Q 40/00* (2006.01)
(52) U.S. Cl. .......................... 705/39; 705/35
(58) Field of Classification Search .............. 705/39, 705/42, 35, 40
See application file for complete search history.

(56) References Cited

U.S. PATENT DOCUMENTS

| | | | |
|---|---|---|---|
| 4,774,663 A | 9/1988 | Musmanno et al. | |
| 4,985,833 A | 1/1991 | Oncken | |
| 5,893,078 A | 4/1999 | Paulson | |
| 6,374,231 B1 | 4/2002 | Bent et al. | |
| 7,302,413 B1 | 11/2007 | Bent et al. | |
| 7,376,606 B2 | 5/2008 | Jacobsen | |
| 7,398,245 B1 | 7/2008 | Bent et al. | |
| 7,440,914 B2 | 10/2008 | Jacobsen | |
| 7,509,286 B1 | 3/2009 | Bent et al. | |
| 7,519,551 B2 | 4/2009 | Bent et al. | |
| 7,536,350 B1 | 5/2009 | Bent et al. | |
| 7,596,522 B1 | 9/2009 | Jacobsen | |
| 7,603,307 B2 | 10/2009 | Jacobsen | |
| 7,640,199 B1 | 12/2009 | Hyland | |
| 7,668,771 B1 | 2/2010 | Bent et al. | |
| 7,668,772 B1 | 2/2010 | Bent et al. | |
| 7,672,886 B2 | 3/2010 | Bent et al. | |
| 7,672,901 B1 | 3/2010 | Bent et al. | |
| 7,672,902 B1 | 3/2010 | Bent et al. | |
| 7,680,716 B1 | 3/2010 | Bent et al. | |

(Continued)

OTHER PUBLICATIONS

Lloyds TSB Group PLC (Regulatory News Service, Feb. 11, 2000. WRNS, Part 2, pp. 7-42).*

(Continued)

*Primary Examiner* — Ojo O Oyebisi
(74) *Attorney, Agent, or Firm* — Sterne, Kessler, Goldstein & Fox P.L.L.C.

(57) ABSTRACT

A method, system and computer program product for auditing and reconciling custodial accounts. A tool is provided to allow a custodial agent to audit a custodial account at one or more depository institutions at which deposits are held by the custodial agent on behalf of one or more individuals and reconcile such accounts. According to one embodiment, the method includes comparing account balance data from a depository institution for a custodial account against account balance data from a second source for the custodial account, identifying discrepancies between the balance data from the depository institution and the balance data from the second source, identifying a prospective write-off in the amount of one or more of the discrepancies, and prompting the custodial agent to indicate whether the custodial agent accepts the prospective write-off. The prospective write-off may be offset against an account.

23 Claims, 25 Drawing Sheets

U.S. PATENT DOCUMENTS

| | | | |
|---|---|---|---|
| 7,680,734 | B1 | 3/2010 | Bent et al. |
| 7,716,131 | B2 | 5/2010 | Bent et al. |
| 7,752,107 | B1 | 7/2010 | Bent et al. |
| 7,752,129 | B2 | 7/2010 | Bent et al. |
| 7,769,688 | B1 | 8/2010 | Bent et al. |
| 7,809,640 | B1 | 10/2010 | Bent et al. |
| 2005/0044038 | A1 | 2/2005 | Whiting et al. |
| 2005/0154662 | A1 | 7/2005 | Langenwalter |
| 2006/0047593 | A1 | 3/2006 | Naratil et al. |
| 2006/0212378 | A1 | 9/2006 | Hoffman et al. |
| 2007/0005493 | A1* | 1/2007 | Kandravy et al. ............ 705/39 |
| 2007/0043666 | A1 | 2/2007 | Burdette |
| 2007/0276752 | A1 | 11/2007 | Whiting et al. |
| 2008/0052215 | A1 | 2/2008 | Tudisco |
| 2008/0288398 | A1 | 11/2008 | Maricondi |
| 2009/0048954 | A1 | 2/2009 | Blackburn et al. |
| 2009/0106161 | A1 | 4/2009 | Alemany |

OTHER PUBLICATIONS

"First Horizon Bank Health Savings Account Sweep Agreement and Investment Instructions," http://www.firsthorizonmsaver.com/files/mutual_fund_app.pdf; accessed Sep. 17, 2010 (6 pages).

King, Amanda Swift, "Untangling the effects of credit cards on money demand: convenience usage vs. borrowing," *Quart. J. Bus. Econ.* 43(1/2):57-80, University of Nebraska-Lincoln, United States (2004) (33 pages).

Nair, S. K., et al., "A Specialized Inventory Problem in Banks: Optimizing Retail Sweeps," *Prod. Oper. Manag.* 17(3): 285-295, Wiley-Blackwell, United States (2008) (16 pages).

O'Brien, Christine D., et al., "International liquidity management: Solutions for the 21st century," *TMA Journal* 15(2):28-35 (1995) (7 pages).

* cited by examiner

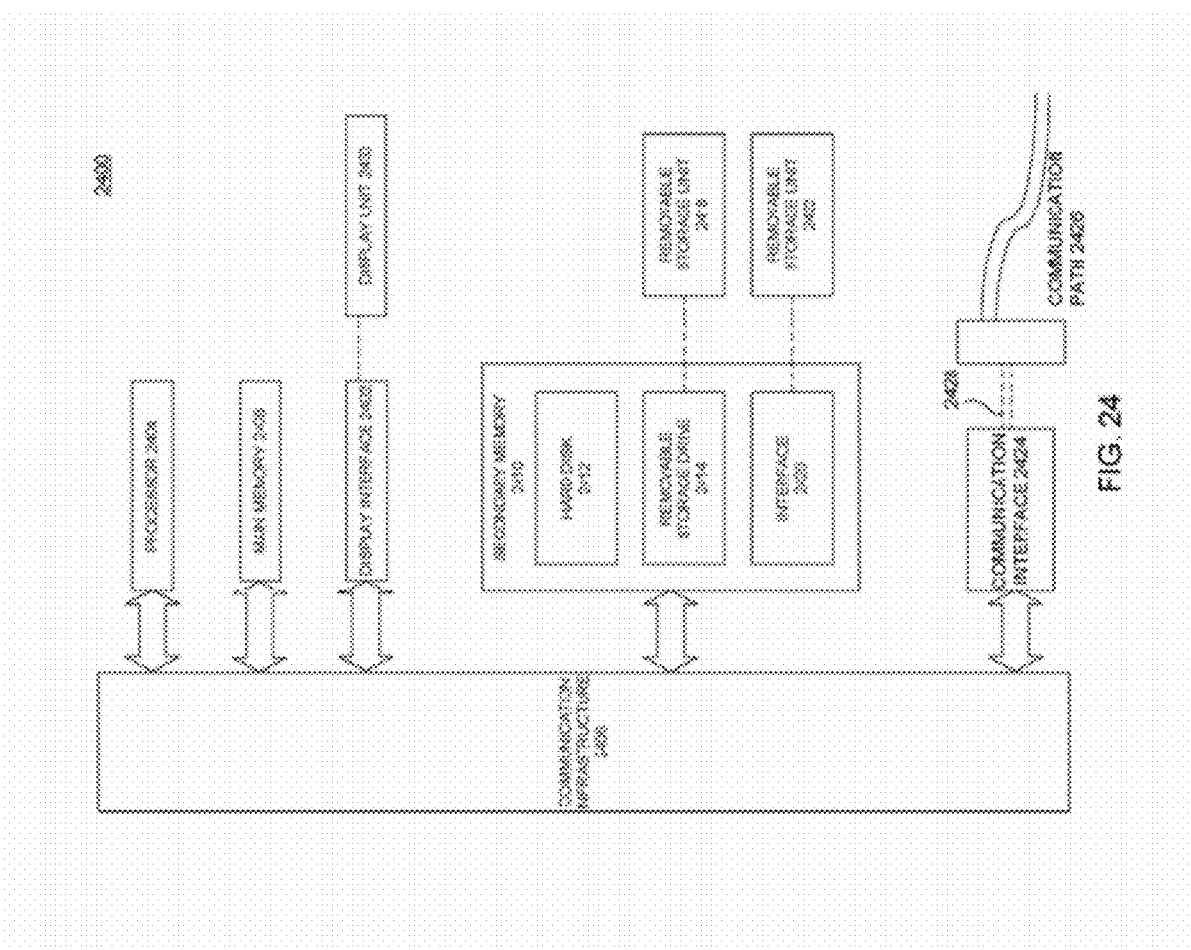

AUDITING AND RECONCILING CUSTODIAL ACCOUNTS

CROSS-REFERENCE

This application is a continuation of U.S. application Ser. No. 11/556,662, filed Nov. 3, 2006, which is hereby incorporated herein in its entirety by reference hereto.

BACKGROUND OF THE INVENTION

1. Field of the Invention

The present invention relates generally to the management of financial accounts and more particularly, to a method, system and computer program product for auditing and reconciling custodial accounts.

2. Background Art

Through a custodial arrangement, deposit accounts may be established at one or more depository institutions by an agent and/or custodian on behalf of its customers. (Such deposit accounts are referred to herein as "custodial deposit accounts.") The agent and/or custodian responsible for establishing and holding such deposit accounts may be, for example, a broker-dealer registered under the Securities Exchange Act of 1934 as amended (referred to herein as a "broker-dealer"), a bank, a credit union, or another regulated financial institution. (Such agent and/or custodian is referred to herein as a "custodial agent"). For example, a broker-dealer may automatically invest, or "sweep," funds (e.g., free credit balances) from a customer's brokerage account into interest-bearing deposit accounts, which may be, or include, a money market deposit account. If funds are needed by the customer to settle securities transactions or cash management activity, funds are withdrawn by the broker-dealer to cover such transactions.

In some banking systems around the world, deposit accounts are insured by government-run deposit insurance programs up to an established deposit insurance limit. In the United States, for example, the current federal deposit insurance limit is generally $100,000 per depositor (in each insurable capacity) in any one insured depository institution. Custodial agents wishing to offer their customers government-backed insurance in excess of the established insurance limit have limited options. One option is for the custodial agent to place customer funds in a network of depository institutions in amounts that do not exceed the deposit insurance limit for each customer at each depository institution, permitting customer funds to be eligible for insurance coverage in excess of the basic $100,000 limit.

These sweep arrangements benefit depository institutions in the bank network, by providing a large, stable source of deposits. Bank reserve requirements can be managed by utilizing a dual deposit account structure. Each custodial agent establishes a money market deposit account ("MMDA") and a transaction account ("TA") with each depository institution in the name of the custodial agent as agent and/or custodian for its customers (the "Custodial MMDA" and the "Custodial TA"). Each customer's MMDA and TA are evidenced by books and records maintained by the custodial agent (the "Customer MMDA" and the "Customer TA").

The Customer MMDA serves as the customer's primary deposit account and is the source of funds for the Customer TA. In order to comply with banking regulations, fund withdrawals to outside entities are directed from the Customer TA. In the United States, for example, Regulation D of the Board of Governors of the Federal Reserve System ("Regulation D") limits transfers from an MMDA account to six per month. This limit can be managed, for example, by transferring the entire Customer MMDA account to the Customer TA before the customer exhausts the monthly limit. Such transfers allow the customer to retain access to all cash in his or her deposit account. Transfers from the Custodial MMDA to the Custodial TA may exceed the six transfers per month restriction in Regulation D so long as each Customer MMDA complies with the restriction. Regulation D compliance is accomplished by enforcement of the transfer and withdrawal restrictions by the custodial agent with respect to each Customer MMDA.

Notwithstanding the above-described benefits, however, such custodial arrangements create complexities for both the custodial agent and the depository institution. There exists a need, therefore, for a method and system for auditing and reconciling such custodial accounts.

BRIEF SUMMARY OF THE INVENTION

The present invention is directed to a method, system and computer program product for auditing and reconciling custodial accounts. According to the present invention, a tool is provided to allow a custodial agent to audit activity and balances in one or more custodial accounts at one or more depository institutions at which deposits are held by the custodial agent on behalf of one or more individuals and reconcile such accounts.

In one embodiment a method, system and computer program product are provided for reconciling a custodial account held at a depository institution by a custodial agent on behalf of one or more individuals. The method comprises the steps of comparing account balance data from the depository institution for the custodial account against account balance data from a second source for the custodial account, identifying discrepancies between the balance data from the depository institution and the balance data from the second source, identifying a prospective write-off in the amount of one or more of the discrepancies, and prompting the custodial agent to indicate whether the custodial agent accepts the prospective write-off. The method may also include the step of allowing the custodial agent to not accept the prospective write-off. The prospective write-off may be an offset against an account, such as an offset against a fee charged to the depository institution by the custodial agent. Account balance data from the second source may be derived from transaction data for a customer account of the one or more individuals prior to the comparing step. The depository institution may be one of a network of banks at which deposits are held by the custodial agent on behalf of the one or more individuals. Further steps according to the method may include selecting the depository institution from a plurality of depository institutions at which deposits are held by the custodial agent on behalf of the one or more individuals and/or selecting the custodial account from one or more custodial accounts held at a plurality of depository institutions by the custodial agent.

In a second embodiment a method, system and computer program product are provided for auditing a custodial account held at a depository institution by a custodial agent on behalf of one or more individuals. The method comprises deriving account balance data for the custodial account from transaction data for a customer account of the one or more individuals, comparing the derived account balance data against account balance data for the custodial account from the depository institution, identifying discrepancies between the account balance data from the depository institution and the derived account balance data, and displaying the discrepancies. A prospective write-off may be identified in the amount of one or more of the discrepancies and the custodial agent may be prompted to indicate whether the custodial agent accepts the prospective write-off. The depository institution may be one of a network of banks at which deposits are held by the custodial agent on behalf of the one or more individuals.

BRIEF DESCRIPTION OF THE DRAWINGS/FIGURES

The accompanying drawings, which are incorporated herein and form a part of the specification, illustrate the present invention and, together with the description, further serve to explain the principles of the invention and to enable a person skilled in the pertinent art to make and use the invention.

FIG. 24 is a block diagram of an exemplary computer system useful for implementing the present invention.

DETAILED DESCRIPTION OF THE INVENTION

An exemplary embodiment of the present invention is now described with reference to the figures, where like reference numbers indicate identical or functionally similar elements. This is for convenience only and is not intended to limit the application of the present invention. In fact, after reading the following description, it will be apparent to one skilled in the relevant art(s) how to implement the following invention in alternative embodiments. While the following embodiment is directed to a deposit sweep arrangement between a broker-dealer and one or more of its customers, it will be understood that this is an embodiment of the present invention and that the present invention can be applied in other arrangements where a custodial agent is an agent and/or custodian for one or more individuals. Additionally, while the following embodiment is directed to the auditing and reconciliation of one or more custodial accounts held at one or more depository institutions in a network of depository institutions, it will be understood that the present invention also has applicability to one or more custodial accounts held at a single depository institution on behalf of one or more individuals.

In one embodiment, the present invention provides a system, method and computer program product for auditing and reconciling bank deposits held at one or more depository institutions on behalf of customers of a broker-dealer acting as the custodial agent (CA) for such customers. A reconciliation toolkit is provided to allow the custodial agent to audit activity and balances in deposit accounts at one or more depository institutions in a bank network and reconcile such accounts. Small discrepancies (out of balance conditions) can be identified and, if desired, written off to achieve a balanced reconciled state in a cost effective and efficient process. Discrepancies may be offset against an account, for example, offset against a fee account maintained between the depository institution and the custodial agent. A fee settlement activity summary is also provided, detailing monthly fee activities and write-offs. The reconciliation toolkit also provides depository institutions in the bank network with a sophisticated interest accrual engine and reporting system, to insure that network banks understand and comply with the operational needs of the custodial agent.

Figure 1:
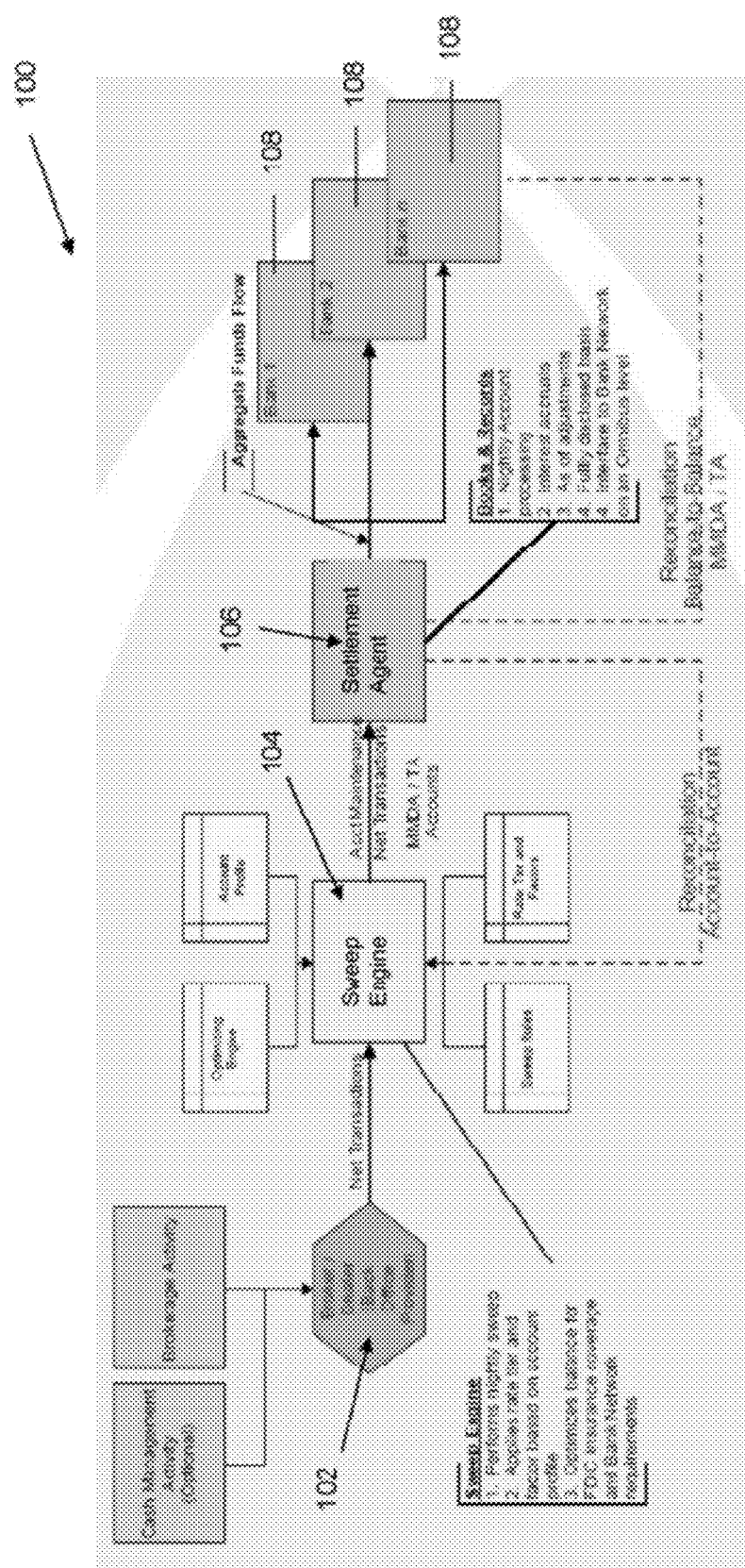
FIG. 1 is a block diagram of an exemplary deposit sweep arrangement according to the present invention.

FIG. 1 is a block diagram providing an overview of the flow of customer funds in an exemplary deposit sweep arrangement 100 according to the present invention. Deposit sweep arrangement 100 includes a broker-dealer back office service provider 102, a deposit sweep engine 104, a settlement agent 106 and one or more depository institutions 108.

As described above, in one embodiment, each custodial agent establishes an MMDA and a TA with each depository institution in the name of the custodial agent as agent and/or custodian for one or more customers (the "Custodial MMDA" and the "Custodial TA"). Each customer's MMDA and TA are evidenced by books and records maintained by the custodial agent (the "Customer MMDA" and the "Customer TA"). The Customer MMDA serves as the customer's primary deposit account and is the source of funds for the Customer TA. In order to comply with banking regulations, fund withdrawals to outside entities are directed from the Customer TA and the entire Customer MMDA account is transferred to the Customer TA before the customer exhausts the monthly transfer limit. For example, transfers from the Custodial MMDA to the Custodial TA may exceed the six transfers per month restriction in Regulation D so long as each Customer MMDA complies with the restriction. Regulation D compliance is accomplished by enforcement of the transfer and withdrawal restrictions by the custodial agent with respect to each Customer MMDA.

In one embodiment, each depository institution agrees to pay an "all-in rate" in respect of the money held in the custodial accounts. For example, the "all-in rate" may be a Fed Funds Effective Rate plus a set basis point spread. This "all-in rate" can then be allocated into interest to be paid into the customer MMDA account and fees charged to the depository institution by the custodial agent and/or others involved in the maintenance and operation of the deposit sweep arrangement.

Back office service provider 102 collects brokerage activity and cash management activity of customers of the broker-dealer and transmits net customer transactions to sweep engine 104. Sweep engine 104 performs a daily sweep, for example, at night. Sweep engine 104 optimizes swept balances for FDIC insurance coverage and bank network requirements. Sweep engine 104 transmits aggregate transactions to settlement agent 106. Settlement agent 106 provides an interface to the bank network on an aggregate level (e.g. custodial level rather than customer level). Settlement agent 106 sends aggregate funds flow to one or more depository institutions 108 in the bank network. Settlement agent 106 processes aggregate transactions daily, for example, at night. Aggregate funds are invested in custodial accounts (MMDA/TA accounts) at each depository institution 108.

In accordance with an embodiment of the invention, communication of information between the various components of deposit sweep arrangement 100 is accomplished over a network consisting of electronic devices connected either physically or wirelessly, wherein digital information is transmitted from one device to another. Such devices may include, but are not limited to, a desktop computer, a laptop computer, a handheld device or PDA, a telephone, a set top box, an Internet appliance, or the like. Exemplary networks include a Local Area Network, a Wide Area Network, an organizational intranet, the Internet, or the like. The functionality of an exemplary computer and network are further explained in conjunction with FIG. 24, below.

Figure 2:
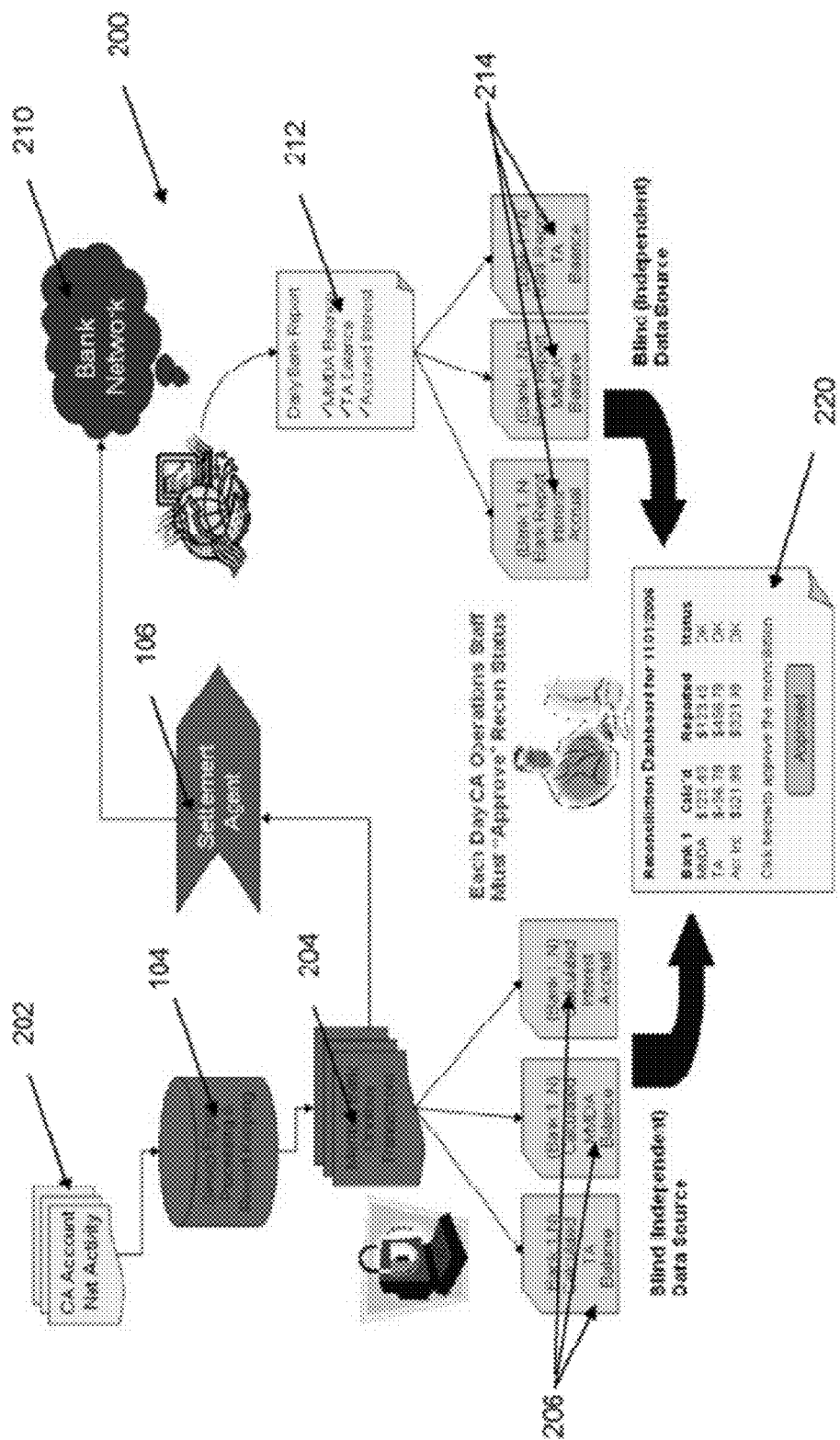
FIG. 2 is block diagram of an exemplary dual blind source reconciliation system according to the present invention.

As shown in FIG. 2, according to an embodiment of the present invention, two independent data sources are maintained. On one side, the custodial agent sends net customer activity 202 (single net transaction per customer account) and deposit sweep engine 104 produces a series of aggregate transactions 204 (executed by settlement agent 106). For accounting purposes, sweep engine 104 also derives TA and MMDA balances and accrued interest data 206 for each depository institution 108 in bank network 210, for example by calculations made by applying the "all-in rate" agreed to between the depository institution and the custodial agent to the daily customer transaction data. On the other side, depository institutions 108 in the bank network 210 are required to provide a "blind" report 212 of the balances and accrued and paid interest 214 for each custodial account (MMDA and TA), for example, at the start of each day. A reconciliation toolkit 220 is provided for custodial agents to manage, approve & store daily reconciliation of the custodial accounts. In one embodiment, bank report 212 is independently compared to data 206 generated by sweep engine 104. In one embodiment, each day authorized personnel from the CA must log-on to affirm the reconciliation of these two independent data sources as having been monitored and verified. Discrepancies can be surfaced and/or resolved. In one embodiment, in order to reduce costs and provide an efficient means of reconciling each custodial account, prospective write-offs may be identified to resolve such discrepancies, rather than conducting a thorough investigation of the origin of the discrepancy. Such a process may be desirable where the discrepancy is minimal and further investigation would not be cost effective. In such an embodiment, the CA is required to approve, postpone or decline prospective write-offs.

The reconciliation toolkit of the present invention is one component of a larger system balancing process. System balancing is performed both on a system-wide and sweep client specific reconciliation basis. The balancing process is comprised of individual balancing steps that conclude in a system-wide balancing process. This method allows for the performance of full-circle system balancing daily, thus vastly reducing the likelihood of an out-of-balance activity lasting longer than a day. The goals are to ensure that the daily activity from back office service provider 102 is accepted, processed, posted and settled, and that the custodial agent is provided with information to balance the customer balances (MMDA and TA) and any fees to the depository institutions' all-in balances. The balancing process produces electronic output that can be passed to the custodial agent as part of a daily system reports distribution.

System balancing is divided into five phases that serve as building blocks on each other starting with the net daily activity received from back-office service provider 102 and concluding with settlement agent 106 reconciliation. By dividing this process into phases it is possible to detect an out-of-balance condition before starting the end of day funds transfer process.

The first phase balances the data received from the broker-dealer back office service provider against the data accepted by the sweep engine. All inbound activity files contain a trailer record that stores the number of records on the file and the total of all debit and credit transactions. During the file processing and parsing process, the three data values referenced are internally computed and stored. When the inbound activity file processing is complete the internally computed record count, aggregated debit and credit transactions are matched to the values stored on the inbound trailer record. These values must be in agreement for processing to continue.

After the inbound activity file is successfully balanced, the sweep engine will begin core processing or allocation of the net daily activity. A second balancing phase occurs during the allocation and posting process, when the sweep engine internally counts the number of transactions received and accumulates the value of credits and debits received. At the conclusion of the processing, these values are compared against the retained control totals from an internal transmission balancing process. This is done to confirm that all transactions provided to the sweep engine have either been posted to the account or, in the case of an error, duly reported.

As a result of the allocation and posting processing, the sweep engine will create a funds transfer report detailing the allocation of the daily activity among the various depository institutions. As a third balancing phase, the total sum of funds allocated across these depository institutions should balance to the net total of credits and debits processed in the allocation and posting phase.

After the final allocation and posting of daily activity transactions, the settlement agent will receive an electronic transmission of wire instructions from or on behalf of the custodial agent. The wires will be posted to a settlement account pending transmissions to/from the depository institutions. A fourth balancing phase occurs at the conclusion of the day, when the settlement account is reconciled to validate that all transmissions have been completed and that expected funds from the depository institutions were received. The net balance of the settlement account should equal the net total on an expected funds settlement balancing report.

On the day following system processing, the custodial account balances and accrued interest from the depository institutions will be obtained for balancing against the derived aggregate deposit balances (e.g. as calculated by applying the all-in rate to the customer account balances) stored within the sweep engine. The first three phases of reconciliation described above can be monitored and verified by a series of daily reports. The settlement agent contracts with the custodial agent to perform the fourth level of reconciliation described above utilizing standard reconciliation processes which include daily verification of "zero balances" in all settlement accounts.

Finally, the fifth balancing phase utilizes the reconciliation toolkit of the present invention to facilitate direct communication, daily balancing and archival between the custodial agent and the network banks.

Figure 3A:
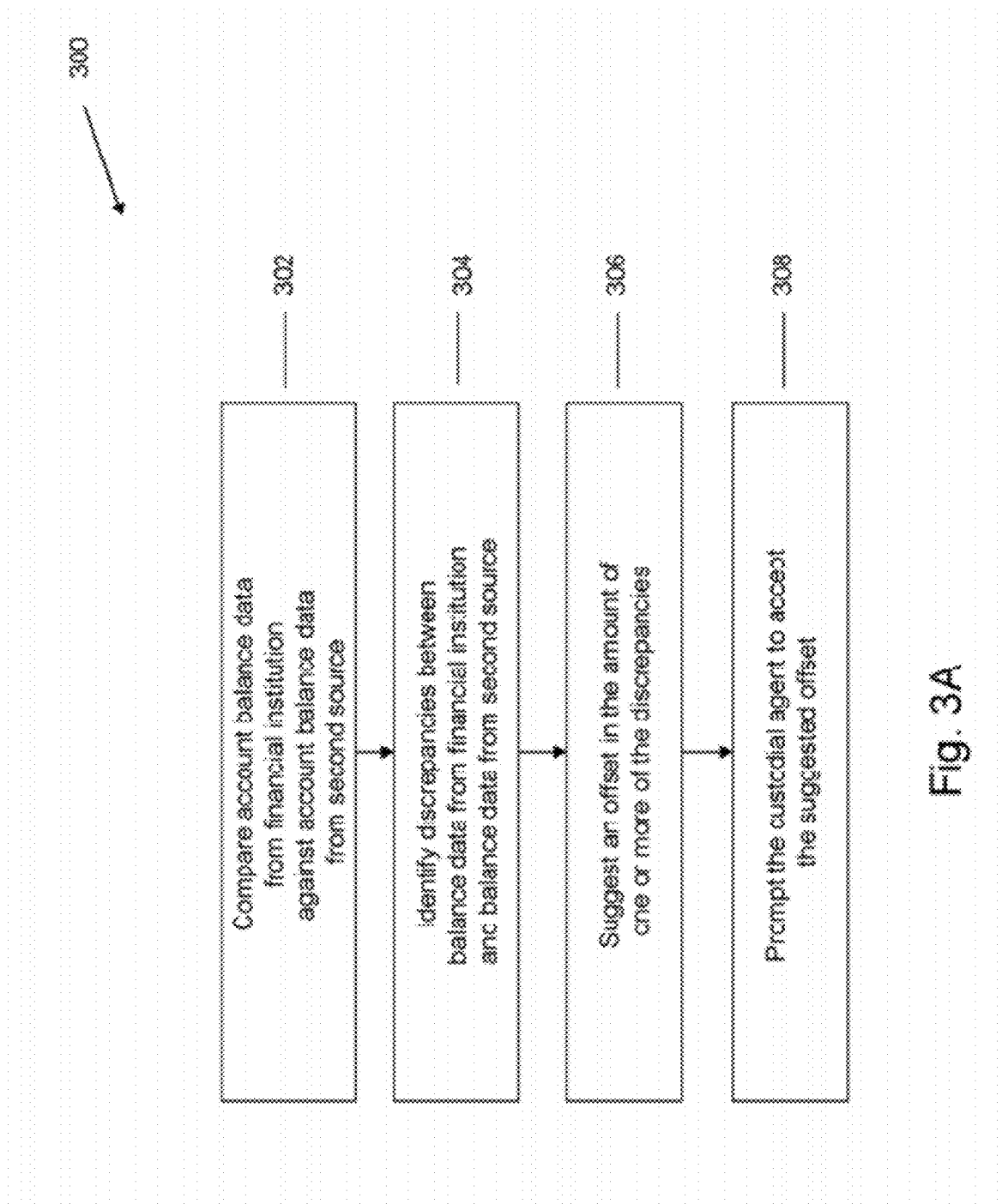
FIG. 3A is a flowchart illustrating a process for reconciling a custodial account held at a depository institution by a custodial agent on behalf of one or more individuals according to an embodiment of the present invention.

FIG. 3A provides a flowchart illustrating a process 300 for reconciling a custodial account held at a depository institution by a custodial agent on behalf of one or more individuals, according to one embodiment of the present invention.

At step 302, account balance data received from the depository institution is compared against account balance data received from a second source, for example, an independent second source, such as the sweep engine. For example, broker-dealer customers A and B may each have $1 million in free credit balances in their customer account. The sweep engine breaks each customer's swept balance into amounts of $100,000 each for deposit at ten different depository institutions. The comparison is between the aggregated deposits in the customer deposit accounts ($1 million each for A and B) and the disaggregated deposits in the custodial deposit accounts (for example, $200,000 at each of ten banks, assuming there are only two customers, ten banks and each bank takes $100,000). Accrued interest and other factors may also be taken into account. In one embodiment, custodial account balances (MMDA and TA) and accrued interest data received from the depository institution are compared to the aggregate deposit balances and derived accrued interest balances calculated by the sweep engine. At step 304, discrepancies between the account balance data from the depository institution and the account balance data from the second source are identified. Such discrepancies may include positive or negative out of balance conditions. At step 306, a write-off is identified in the amount of one or more of the discrepancies. In one embodiment, the prospective write-off is offset against an account. For example, the prospective write-off may be offset against a fee account between the depository institution and the custodial agent, tracking fees charged to the depository institution by the custodial agent. Alternatively, a separate account may be maintained to offset daily discrepancies, which can then be satisfied on a daily or monthly basis (for example, a check can be written to cover a negative daily or monthly balance in the offset account). In one embodiment, the second source (e.g. sweep engine) is considered accurate and write-offs are applied to the data received from the depository institution to force a reconciliation. At step 308, the custodial agent is prompted to indicate whether it accepts the prospective write-off. For example, the custodial agent may indicate acceptance of the prospective write-off if the discrepancy is small. Alternatively, the custodial agent may choose to decline or postpone the prospective write-off, for example, if the discrepancy is large.

Figure 3B:
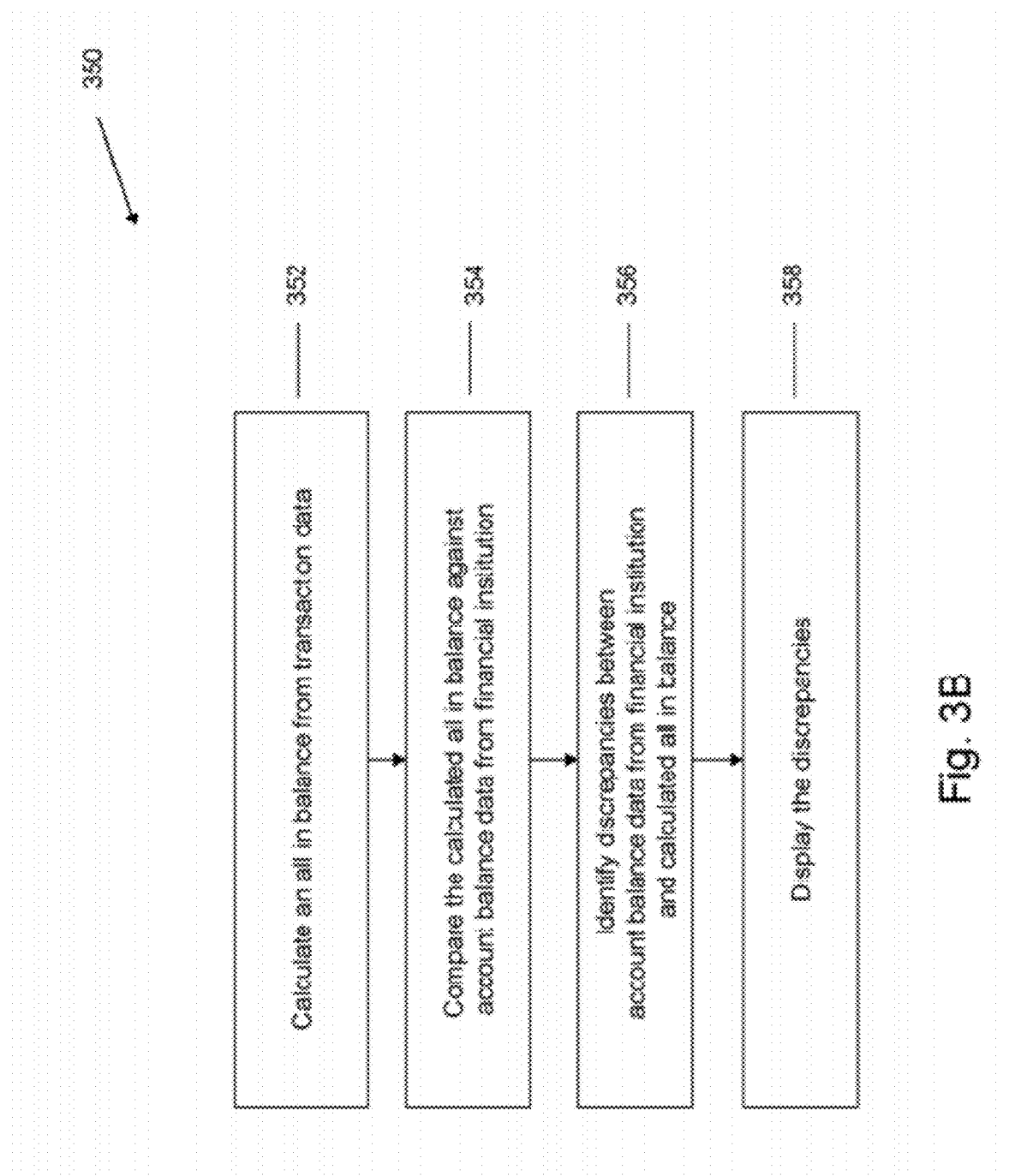
FIG. 3B is a flowchart illustrating a process for auditing a custodial account held at a depository institution by a custodial agent on behalf of one or more individuals according to an embodiment of the present invention.

The reconciliation toolkit of the present invention may also be used simply for auditing a custodial account held at a depository institution by a custodial agent on behalf of one or more individuals. FIG. 3B provides a flowchart illustrating a process 350 for auditing a custodial account held at a depository institution by a custodial agent on behalf of one or more individuals, according to one embodiment of the present invention.

At step 352 an "all-in" balance is derived from transaction data received by the sweep engine. In one embodiment, the all-in balance may consist of principal, interest to be paid to the customer of the custodial agent and one or more fees charged to the depository institution, such as a custodial agent fee and/or other fees. This all-in balance corresponds with the all-in balance of the custodial account reported by the depository institution, after applying the "all-in rate" agreed to by the custodial agent and the depository institutions at the initiation of the deposit sweep arrangement. As discussed above, each depository institution agrees to pay an "all-in rate" on the money held in the custodial accounts. For example, the "all-in rate" may be a Fed Funds Effective Rate plus a set basis point spread. This "all-in rate" can then be divided up by the custodial agent into interest to be paid to the customer of the custodial agent and fees to be charged to the depository institution. As would be apparent to one skilled in the art, an all-in balance can be calculated from transaction data received by the sweep engine. At step 354, the derived balance data is compared against account balance data for the custodial account received from the depository institution. At step 356, discrepancies between the account balance data from the depository institution and the derived balance data are identified. At step 358, any discrepancies are displayed. Discrepancies may include positive or negative amounts or may be zero. For example, as discussed below, the principal balance, accrued interest and paid interest for the custodial accounts (MMDA and TA) are displayed, both as calculated by the sweep engine and as reported by the depository institution. The custodial agent is then able to audit and reconcile the custodial account. As discussed above, a prospective write-off may also be identified in the amount of one or more of the discrepancies and the custodial agent will receive a prompt to indicate whether the custodial agent accepts the prospective write-off. The prompt may include an option to postpone acceptance or non-acceptance. For example, on login, any unreconciled events may appear at the top of the user interface to prompt the user to reconcile the discrepancy. Alternatively, a custodial agent, administrator, other person, or some other combination of persons, may be notified by email of unreconciled events and a link may be provided to a reconciliation page (subject to secure access).

User interfaces may be used by one or more users to view the information provided by the reconciliation toolkit. User interfaces may provide different views of the information to different users. The different views of the information represented by such user interfaces are explained in detail in conjunction with FIGS. 4-23, below. User interfaces may be a graphical user interface or web-based user interface implemented by using, for example, Hyper Text Markup Language (HTML) documents, java applets, javascripts, Active Server Pages (ASP), Common Gateway Interface (CGI) scripts, extensible markup language (XML), dynamic HTML, Cascading Style Sheets (CSS), plug-ins, or the like. Access to the reconciliation toolkit for both depository institutions and custodial agents is, for example, via a secure web interface only accessible by authorized personnel. An administrative interface may also be provided for maintenance of the system.

Figure 4:
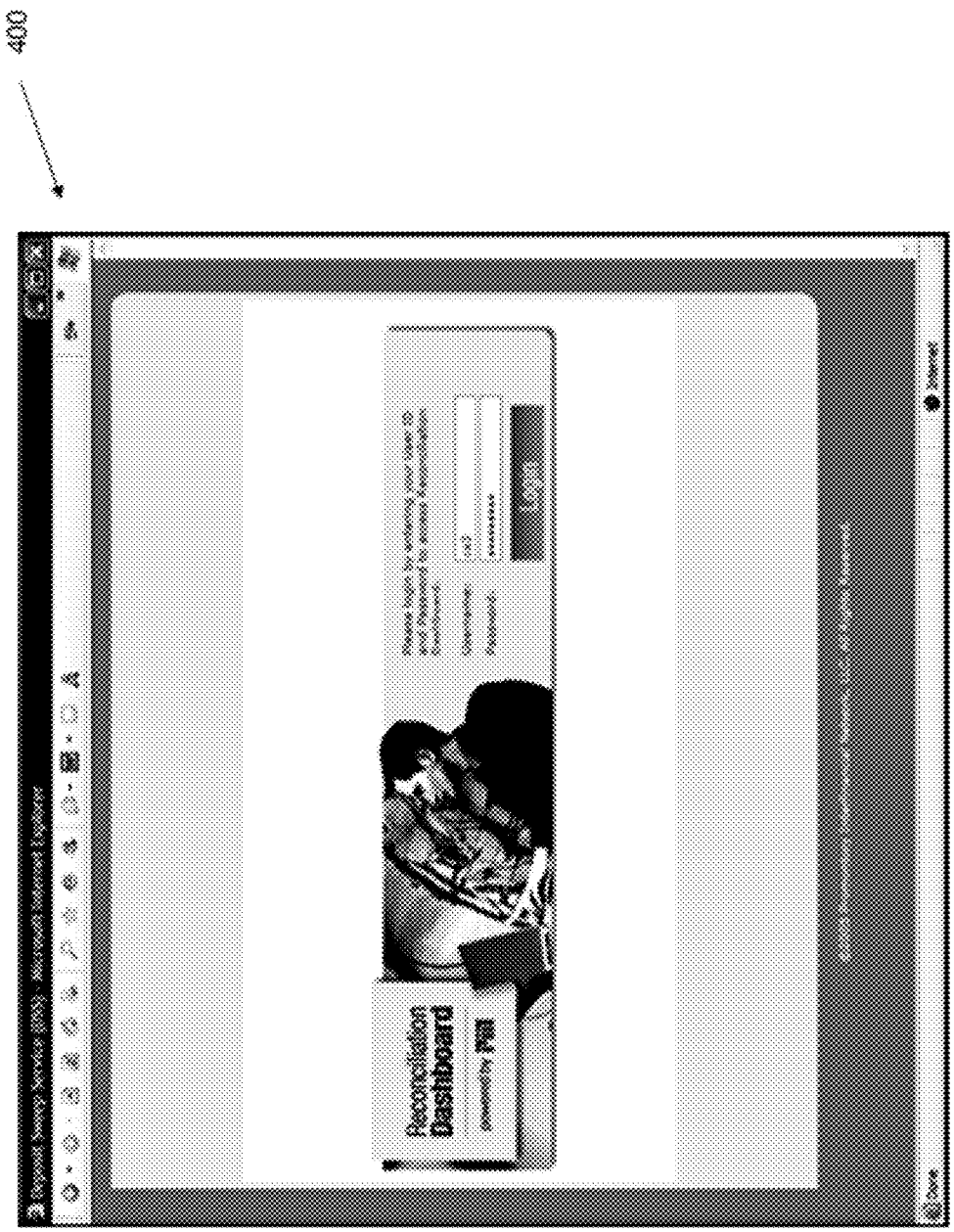
FIG. 4 is an exemplary screen shot generated by the user interface of the present invention.

Referring to FIG. 4, an exemplary display screen or window (hereinafter "screen shot") 400 generated by a user interface according to the present invention is shown providing a user login. For example, a secure login to the reconciliation toolkit is required, controlled by strong passwords requiring a mixture of uppercase, lowercase, numbers and symbols. User access credentials are stored in an underlying user database in an encrypted format. Access to the reconciliation toolkit may be tailored to the various roles a user can assume within the system (e.g. custodial agent, depository institution, administrator, etc.). In one embodiment, only the available functions are shown. The reconciliation toolkit may have no limit or a limit on the number of authorized users.

Figure 5:
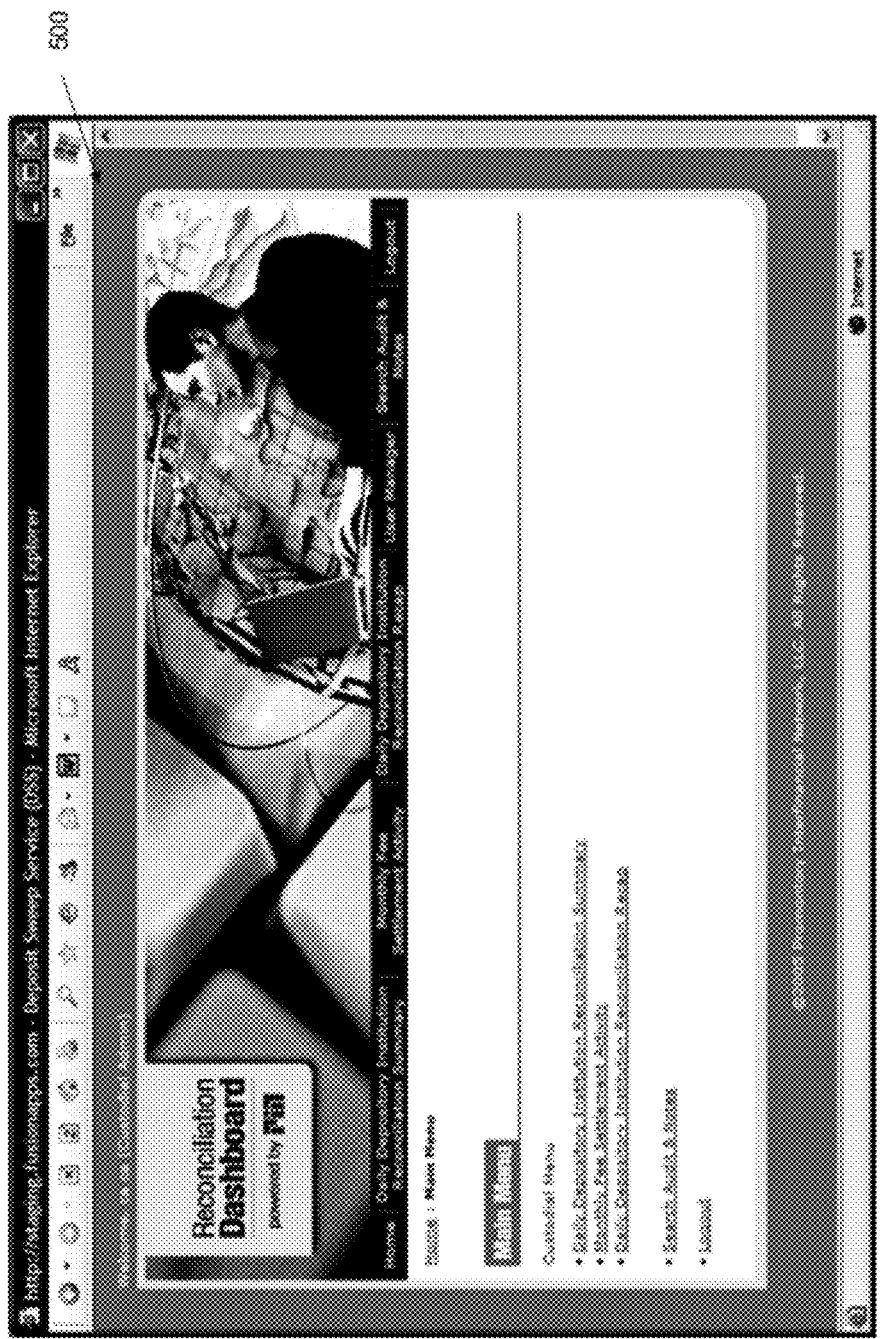
FIG. 5 is another exemplary screen shot generated by the user interface of the present invention.

Referring to FIG. 5, another exemplary screen shot 500 generated by a user interface according to the present invention is shown. In accordance with an embodiment of the invention, FIG. 5 is a view of the reconciliation toolkit as presented to a custodial agent. After login, a custodial agent is presented with the option of accessing a daily depository institution reconciliation summary, monthly fee settlement activity or a daily depository institution reconciliation recap. The custodial agent may also perform user management and search within the data maintained by the reconciliation toolkit. Breadcrumb navigation, context sensitive list style menus and quick access buttons along the top of the interface may allow for quick and simple access to common functions.

Figure 6:
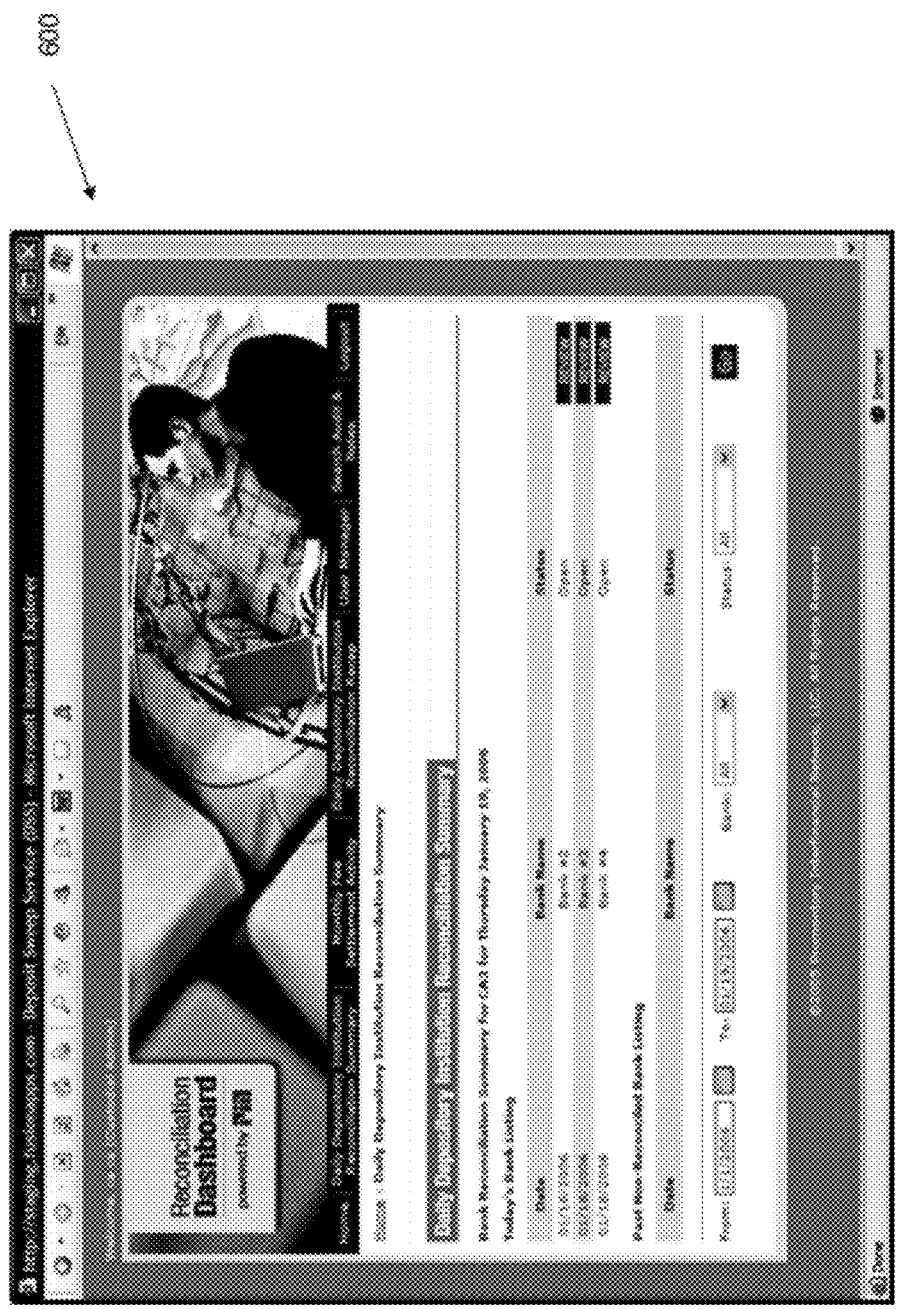
FIG. 6 is another exemplary screen shot generated by the user interface of the present invention.

Referring to FIG. 6, an exemplary daily depository institution reconciliation summary screen shot 600 generated by a user interface according to the present invention is shown. This screen serves as the doorway to all of the detailed reconciliation information. Current, open and un-reconciled positions are bubbled to separate areas of the interface for quick review and past reconciliations can be searched and accessed by a variety of dynamic criteria. The custodial agent can select a depository institution from a plurality of depository institutions at which deposits are held by the custodial agent on behalf of one or more of its customers.

Figure 7:
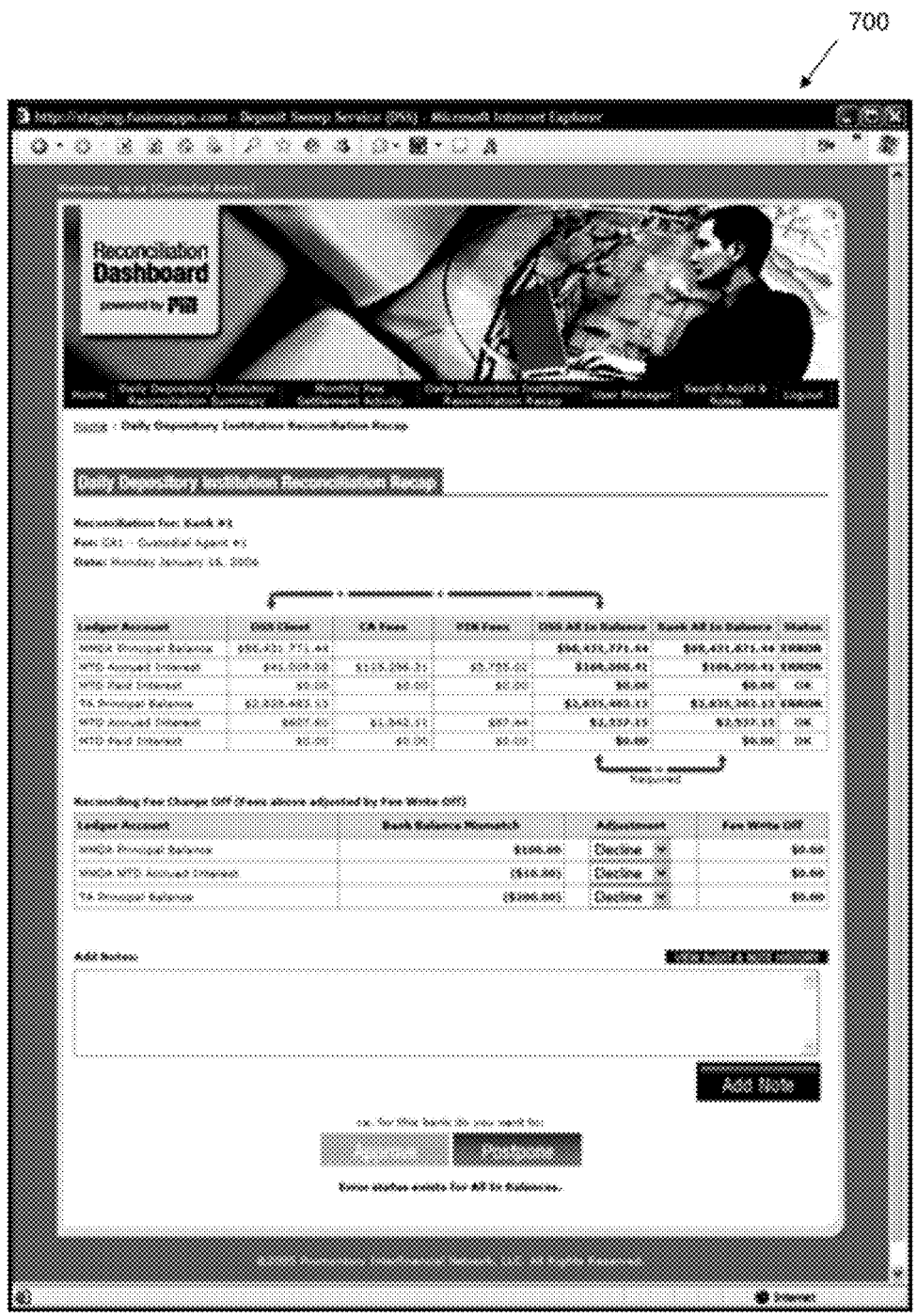
FIG. 7 is another exemplary screen shot generated by the user interface of the present invention.
Figure 8:
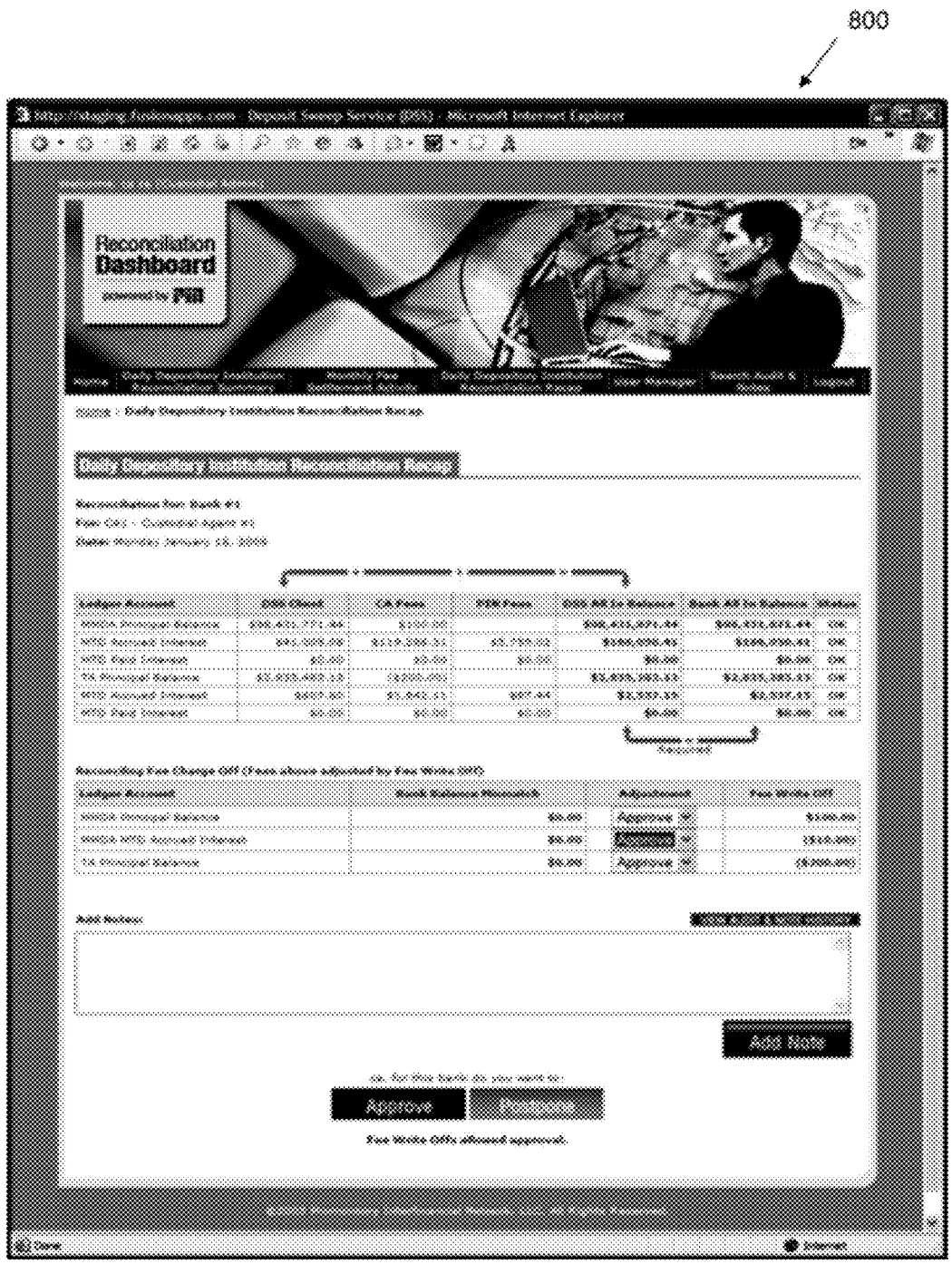
FIG. 8 is another exemplary screen shot generated by the user interface of the present invention.

Referring to FIGS. 7-8, exemplary daily depository institution reconciliation detail windows or screen shots 700, 800 generated by a user interface according to the present invention are shown. Visual cues may be used to help the user to make the complex information presented more intuitive. For example, as shown in FIG. 7, upon entering this review function, out of balance conditions are immediately apparent. The approval function is "grayed out" while error conditions exist. A custodial agent may postpone reconciliation to conduct additional research. Notes can be added to any day's reconciliation activities for future review. A full audit trail is embedded into all actions as well. Small balance discrepancies may be written off to an account, such as a custodial agent fee account, as shown. The upper and/or lower limits for such write-offs are adjustable by each custodial agent.

As shown in FIG. 7, discrepancies between the account balance data from the depository institution and the calculated account balance data are identified. For example, as shown, the reported MMDA principal balance is $100.00 greater than the calculated MMDA principal balance; the reported MMDA month to date accrued interest is $10.00 less than the calculated month to date accrued interest; and the TA principal balance is $200.00 less than the calculated TA principal balance. Prospective offsets against fees in the amounts of these discrepancies are identified.

As shown in FIG. 8, once the adjustments have been "written-off" to the fee calculations the error statuses are now clear and the entries are in balance. The Approval button is now available for processing. A message underneath the approval button indicates that this has been enabled via a fee write-off.

Figure 9:
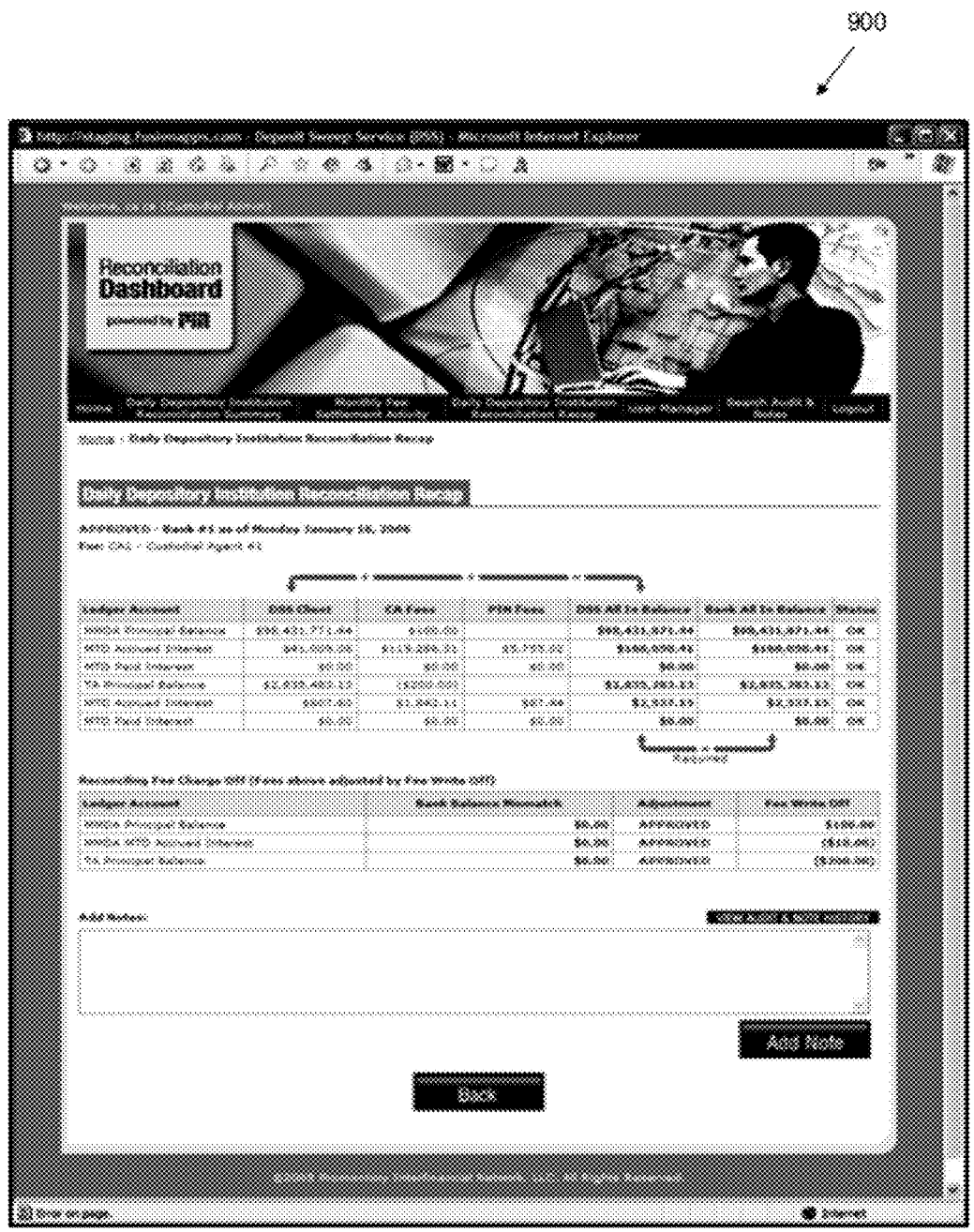
FIG. 9 is another exemplary screen shot generated by the user interface of the present invention.

Referring to FIG. 9, an exemplary daily depository institution reconciliation recap screen shot 900 generated by a user interface according to the present invention is shown. Once the adjustments have been approved, the recap screen is updated to reflect the final reconciled state including any fee write-offs. Both the interim and any final status of this screen may be stored for future review however, once approved the reconciliation is final and no further activity can be accomplished without administrator intervention.

Figure 10:
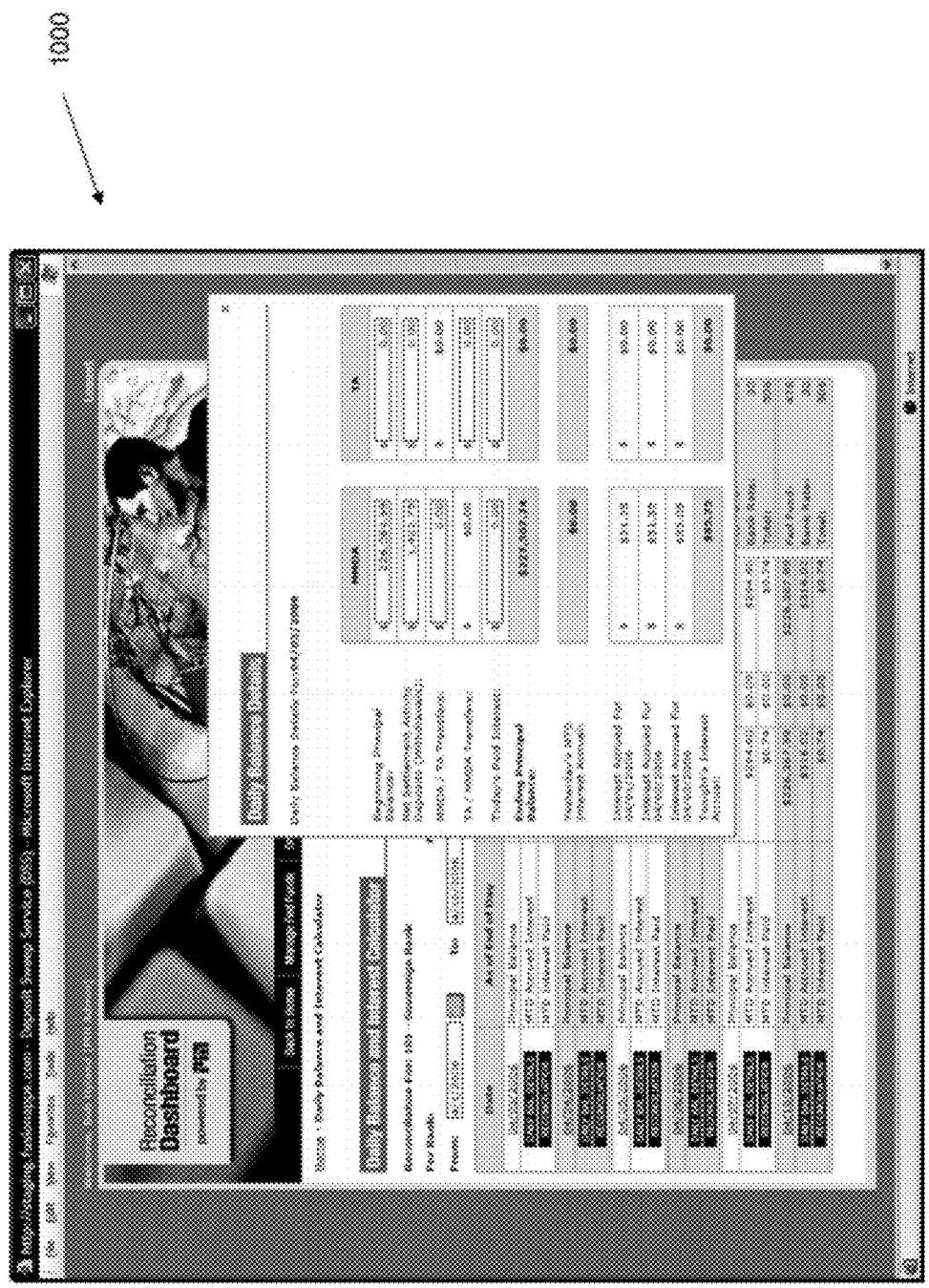
FIG. 10 is another exemplary screen shot generated by the user interface of the present invention.

Referring to FIG. 10, an exemplary daily balance and interest calculator screen shot 1000 generated by a user interface according to the present invention is shown. The Daily Balance and Interest Calculator presents a dynamic online statement for each daily account position. Network banks and custodial agents are able to review the precise account activities and interest accrual/payment information used to derive/calculate the daily balances. The sophisticated interest accrual engine and reporting system insures that network banks understand and comply with the operational needs of the deposit sweep service. Banks pay interest directly to the custodial deposit accounts. Interest is typically accrued daily and paid at month end. The system may be designed to readily support a variable period end date for each month which can be customized by the custodial agent. In the event that individual client accounts are fully redeemed intra-month, the interest is paid for that account (and relieved from the accrual) on the date of the redemption. Interest is also paid when the customer MMDA account "dumps" to the customer TA (in the event that the client has exceeded six transactions) to insure that a later intra-month full redemption would have access to the paid interest for the "dumped" account. For example, as discussed above, banks in the network pay an all-in rate. This rate can then be allocated as desired by the custodial agent, for example, into customer interest and fees charged to the depository institution by the custodial agent.

Figure 11:
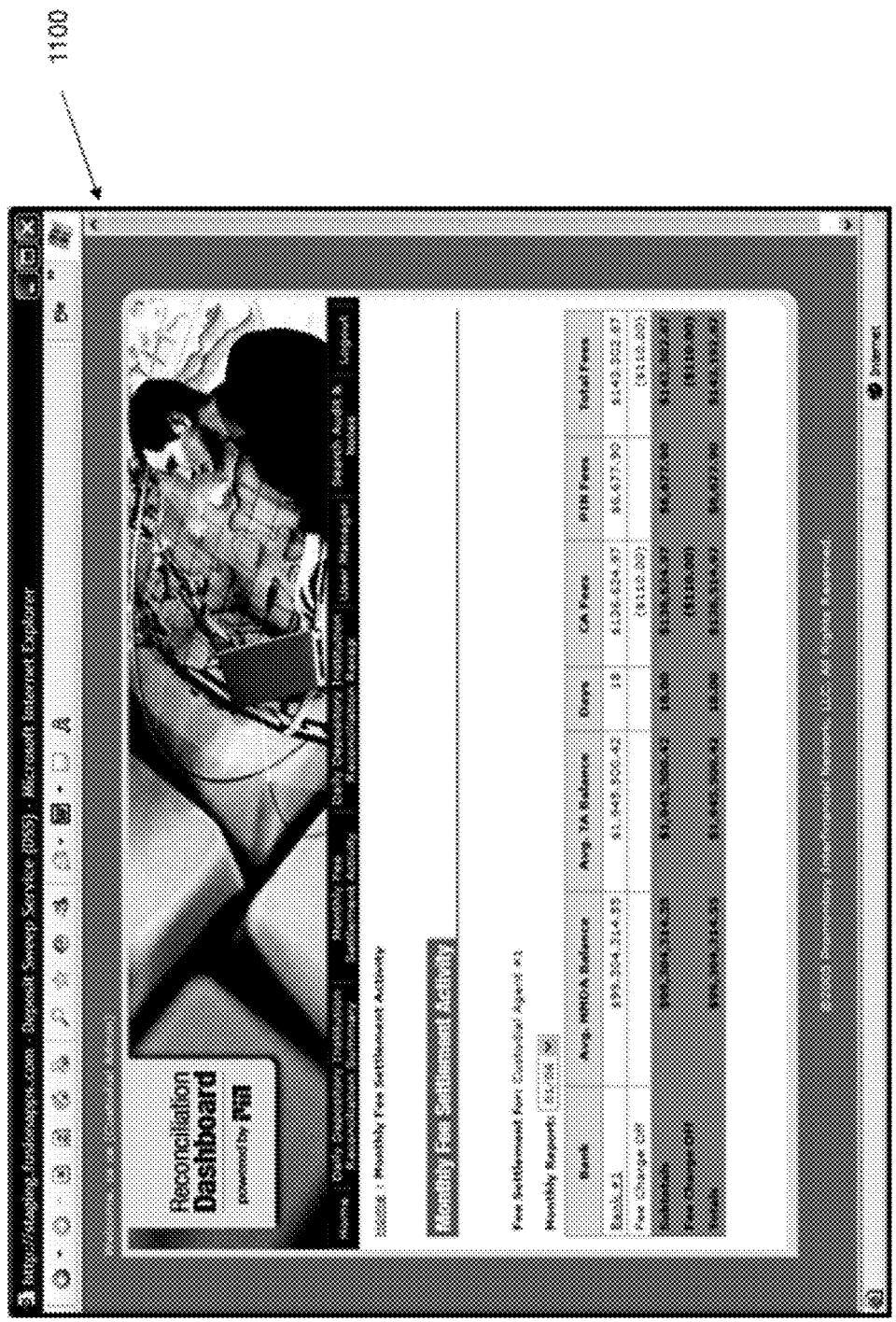
FIG. 11 is another exemplary screen shot generated by the user interface of the present invention.

FIG. 11 shows an exemplary monthly fee settlement activity screen shot 1100 generated by a user interface according to the present invention. For each month, a summary of all of the various fee activities at each bank may be provided, which includes a summary of any fee write-offs necessary to force a reconciliation. Custodial agent fees are detailed as well as any other fees charged to the depository institution.

In one embodiment, the reconciliation toolkit of the present invention automatically archives all activities, for example, for a period of seven years, to aid in future audit and review needs. The system of the present invention also calculates, manages and archives fee settlement activities for each month. A detailed view of each daily fee calculation at each bank may also archived and retrievable, for example, for up to seven years.

Figure 12:
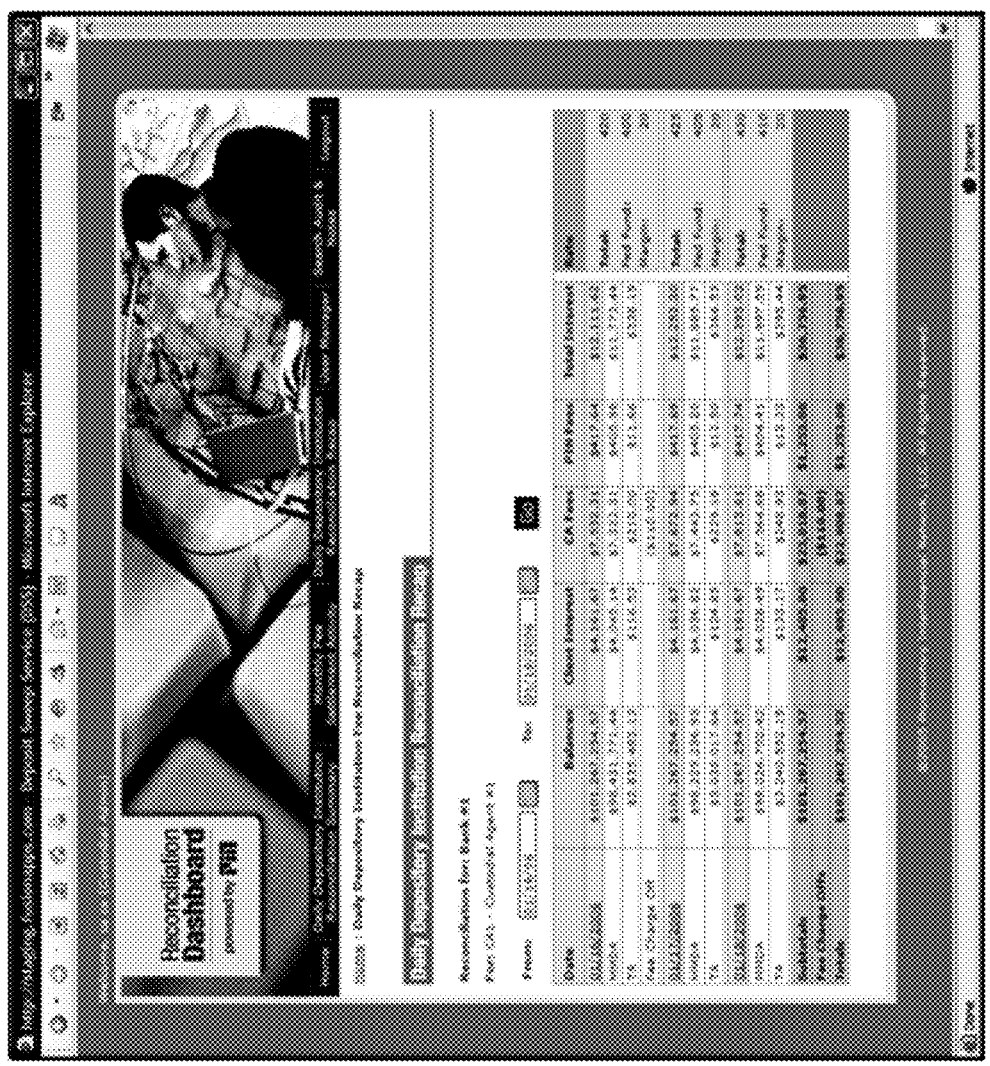
FIG. 12 is another exemplary screen shot generated by the user interface of the present invention.

A detailed view of all of the calculations that roll-up to the monthly fee settlement is also available by day. FIG. 12 shows an exemplary daily depository institution reconciliation recap screen shot 1200 generated by a user interface according to the present invention. It includes rate information used in the calculations including fed fund and custodial agent margin and continues to reflect detailed information on fee write-offs. The daily depository institution reconciliation recap screen can be viewed for each of the depository institutions at which deposits are held by the custodial agent on behalf of one or more of its customers.

Figure 13:
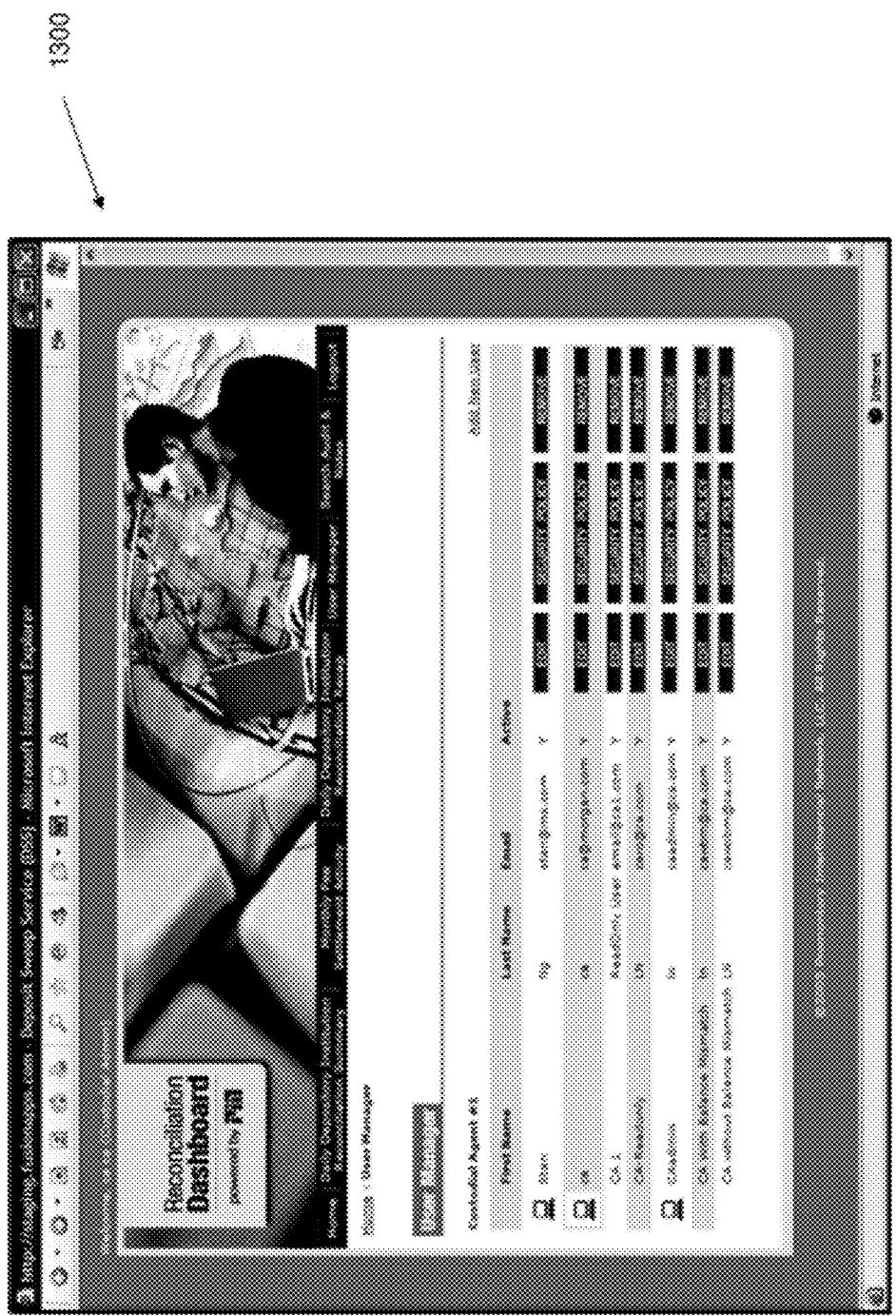
FIG. 13 is another exemplary screen shot generated by the user interface of the present invention.

FIG. 13 shows an exemplary user management screen shot 1300 generated by a user interface according to the present invention. In one embodiment, a robust user and policy management system is provided, to enable the custodial agent to administer their own security. "Read-Only" users may be supported, that can view but not alter reconciliation data.

Additionally, one or more administrative users can be designated, to manage the security policy for a given company.

Figure 14:
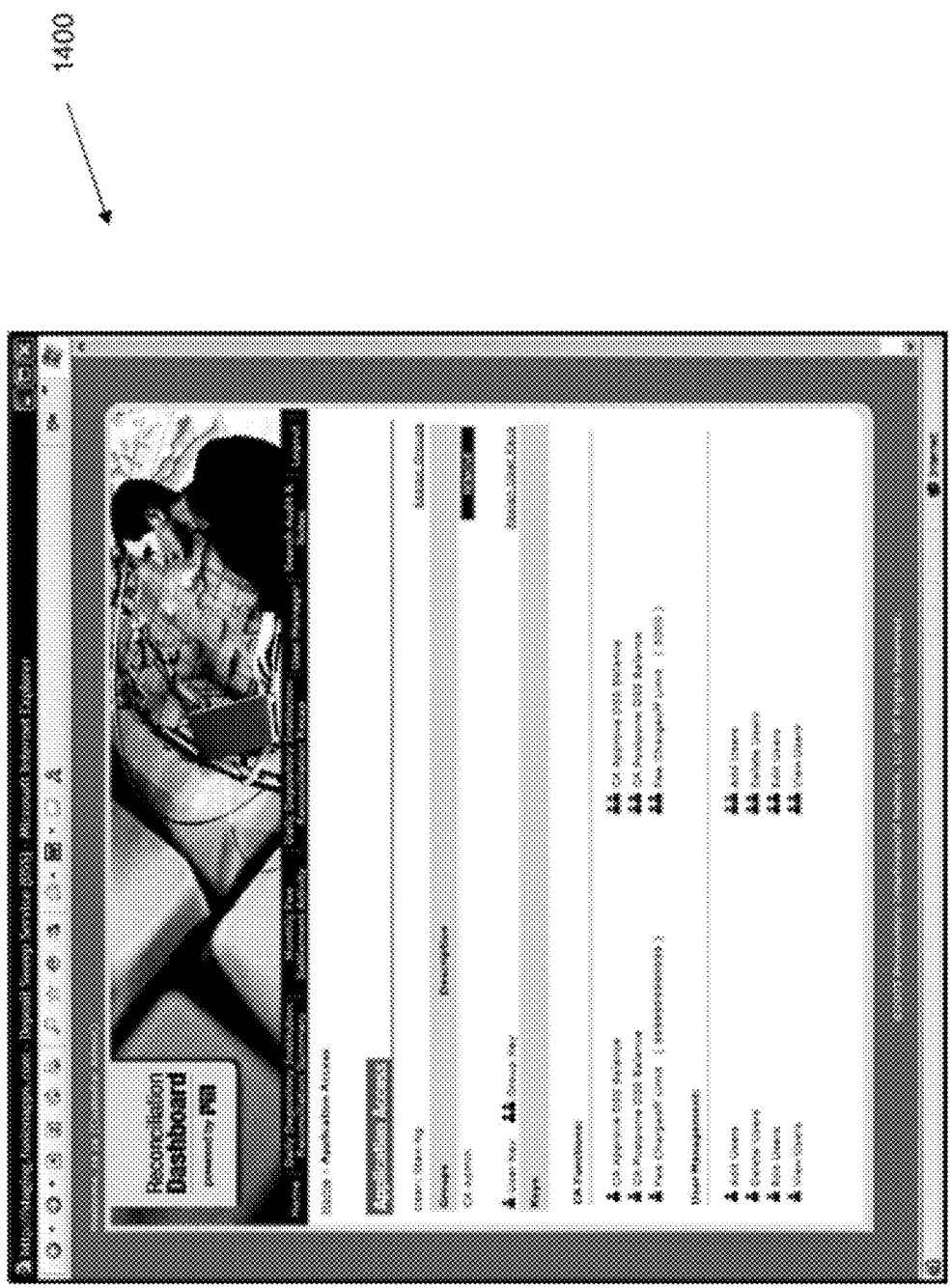
FIG. 14 is another exemplary screen shot generated by the user interface of the present invention.

Referring to FIG. 14, an exemplary application access screen shot 1400 generated by a user interface according to the present invention is shown. Access to applications, functions and limits may be controlled via the granting of "User Security Keys". For example, the limit on the amount a user can "write off" to fees can be set to "0" to effectively disallow fee write-offs and set to a specific maximum dollar amount, to allow fee write-offs for discrepancies below that dollar amount. During the reconciliation process, a user may be reminded that a balance discrepancy exceeds their write-off authority and the write-off approval function is temporarily disabled.

Figure 15:
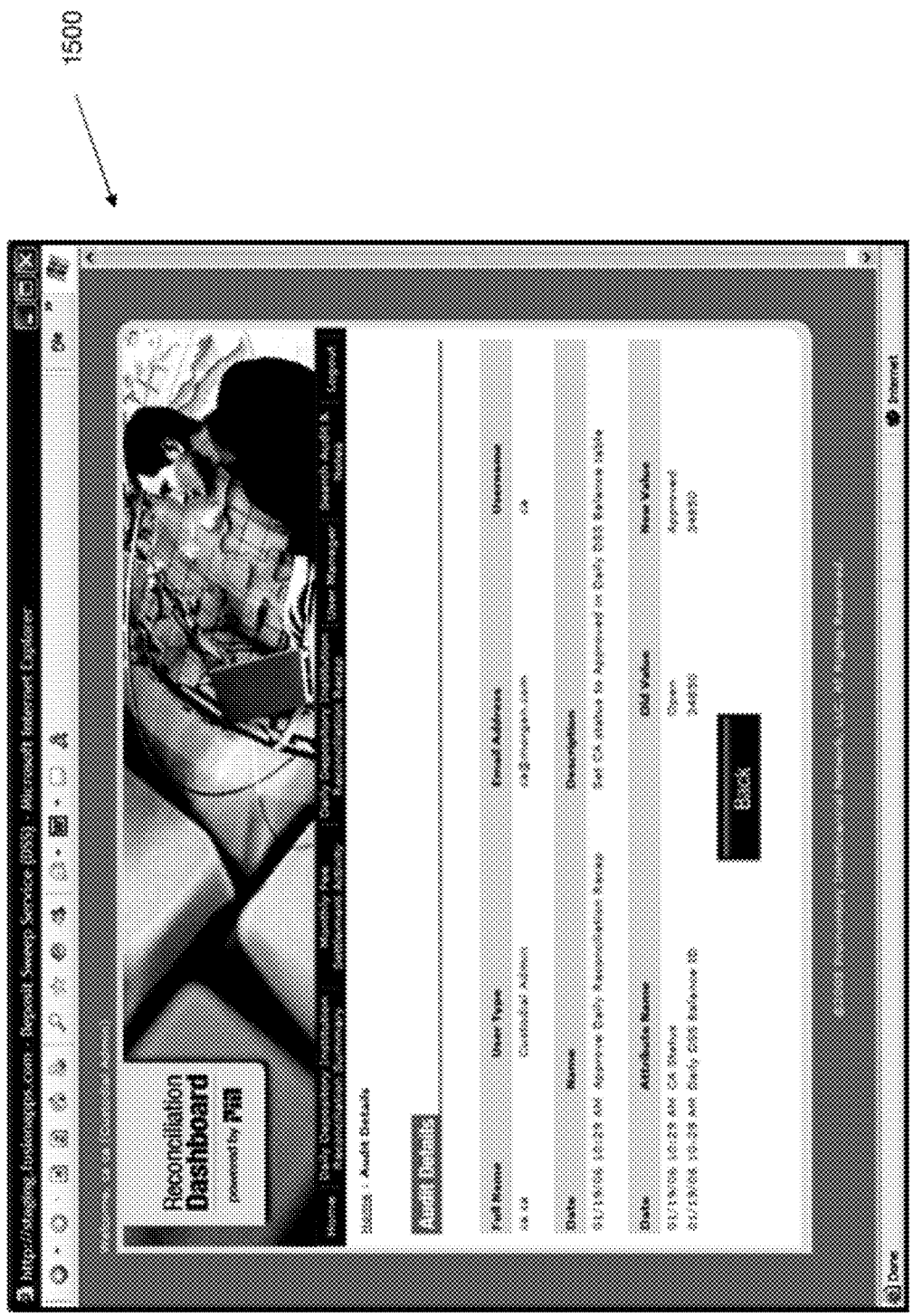
FIG. 15 is another exemplary screen shot generated by the user interface of the present invention.

FIG. 15 shows an exemplary auditing screen shot 1500 generated by a user interface according to the present invention. In one embodiment, the reconciliation toolkit is designed to track virtually every event a user undertakes in the system. A robust reporting mechanism allows for review of system activity by event type, user, and date range. The system may also be designed to store the before and after state of various information as the event is executed.

Figure 16:
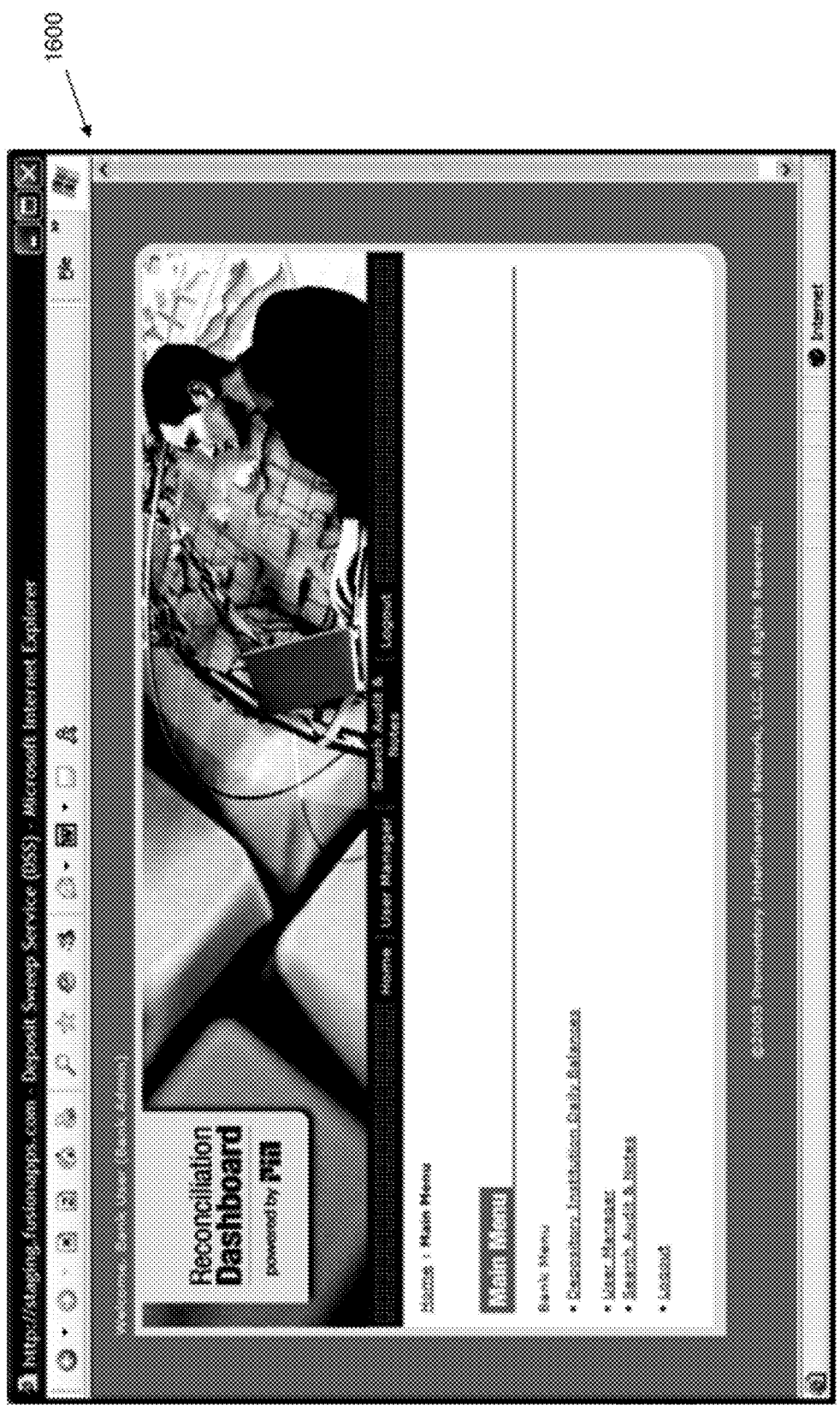
FIG. 16 is another exemplary screen shot generated by the user interface of the present invention.

Referring to FIG. 16, another exemplary screen shot 1600 generated by a user interface according to the present invention is shown. In accordance with an embodiment of the invention, FIG. 16 is a view of the reconciliation toolkit as presented to a depository institution. A separate and very limited menu of functions is exposed to the typical depository institution. In one embodiment, like the custodial agent, the depository institution can review open as well as past submissions of the information they provide in the reconciliation process, however, once reviewed and reconciled by the custodial agent, the depository institution may no longer make edits and the information is marked as "read-only".

Figure 17:
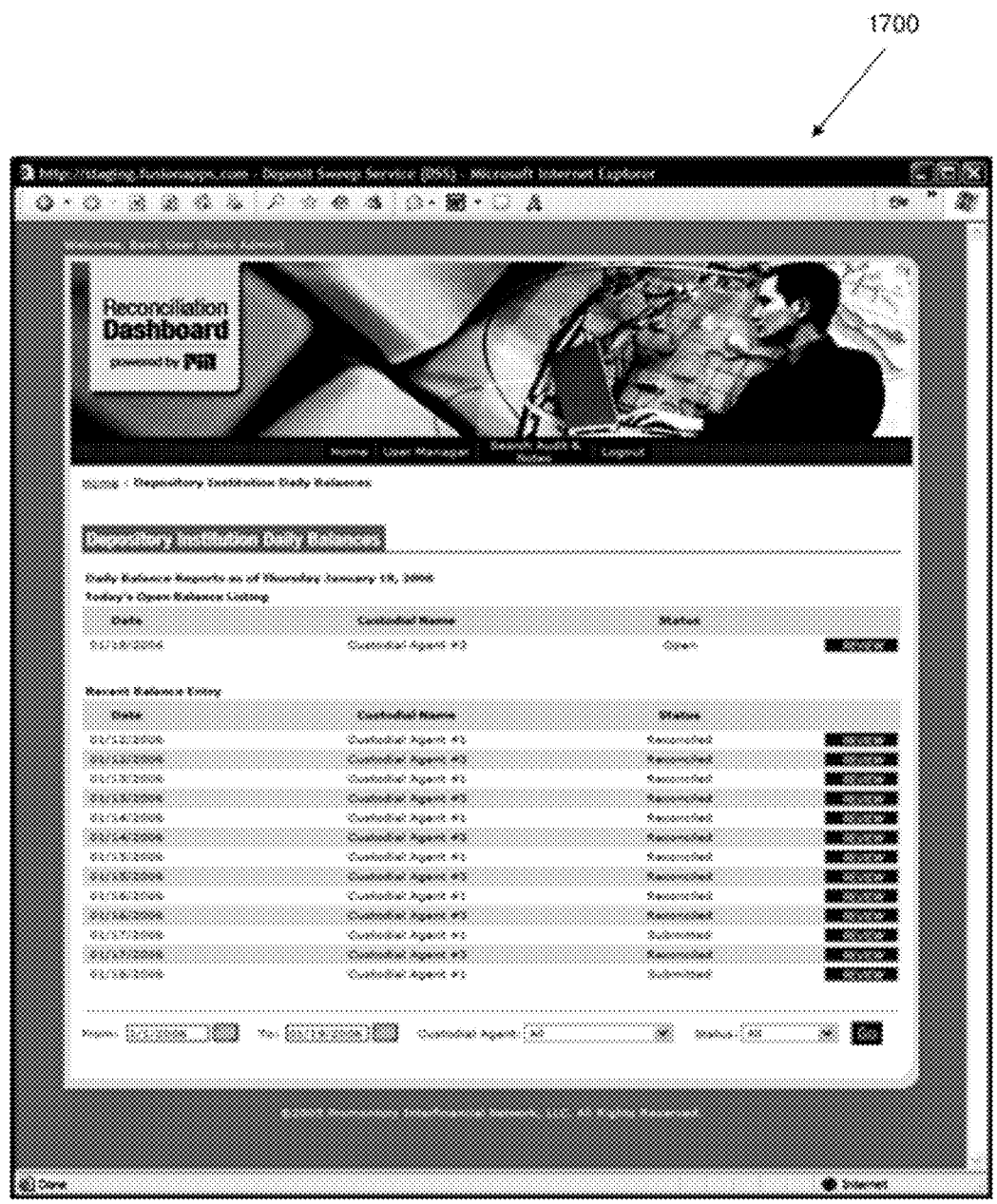
FIG. 17 is another exemplary screen shot generated by the user interface of the present invention.

FIG. 17 shows an exemplary daily balance recap screen shot 1700 generated by a user interface according to the present invention. Recent balance entries are displayed as well as their reconciliation status. Each entry may be reviewed by the depository institution.

Figure 18:
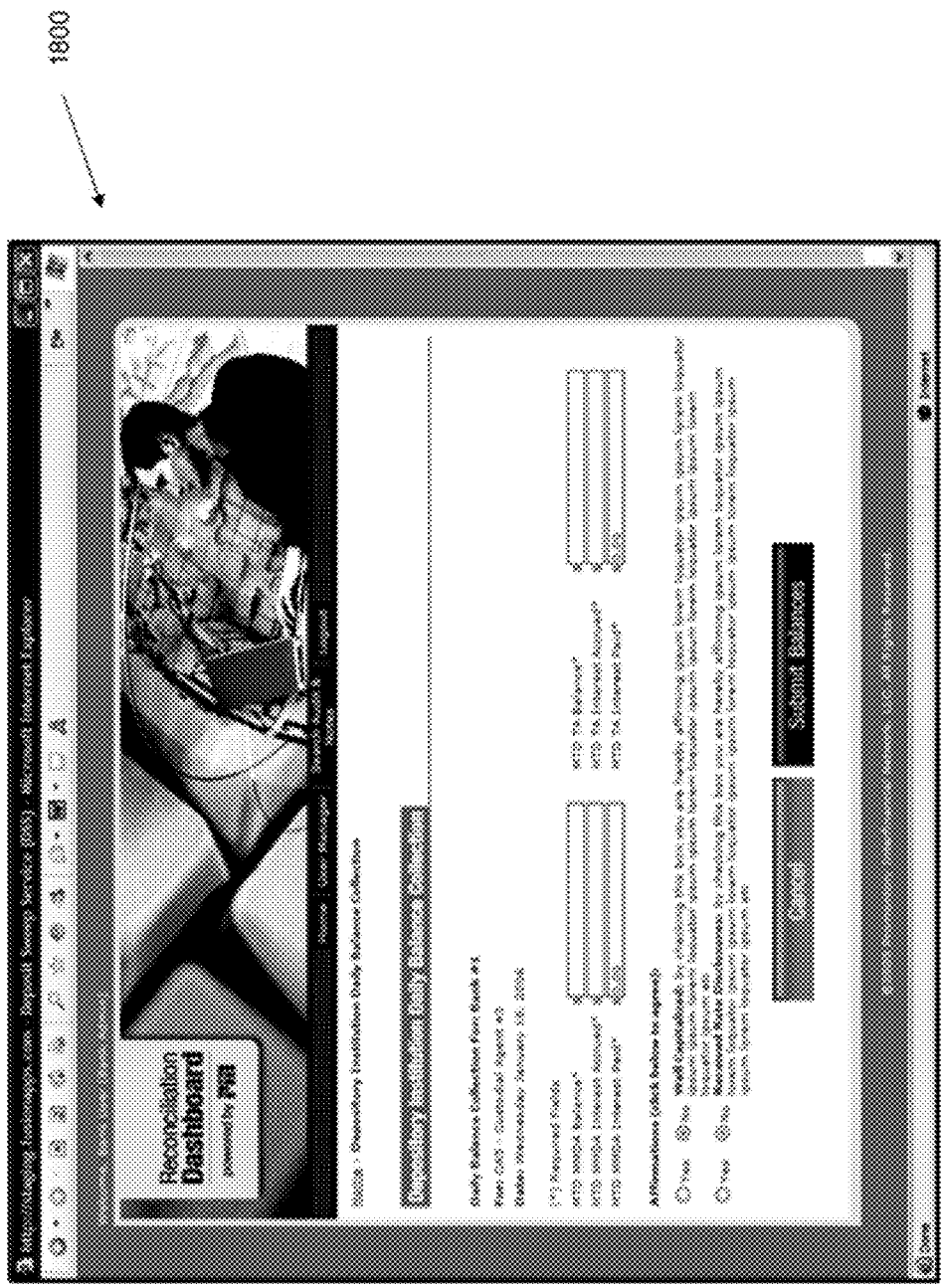
FIG. 18 is another exemplary screen shot generated by the user interface of the present invention.

As discussed above, the depository institution is required to provide a "blind" report of the balances, accrued and paid interest for each custodial account (MMDA and TA) at the start of each day, for example, by 9 AM. In one embodiment, the depository institution is also required to affirm regulatory compliance, such as with respect to capitalization and rate disclosures. FIG. 18 shows an exemplary daily balance collection screen shot 1800 generated by a user interface according to the present invention.

Daily funds instructions may also be provided to the depository institution through the reconciliation toolkit. The funding instructions inform that depository institution as to the settlement amounts it should expect to receive from the settlement agent. Using the Daily Balance and Interest Calculator shown in FIG. 10, the depository institution may capitalize month to date accrued interest for both the MMDA and TA and provide the custodial agent with a monthly end account balance statement.

Figure 19:
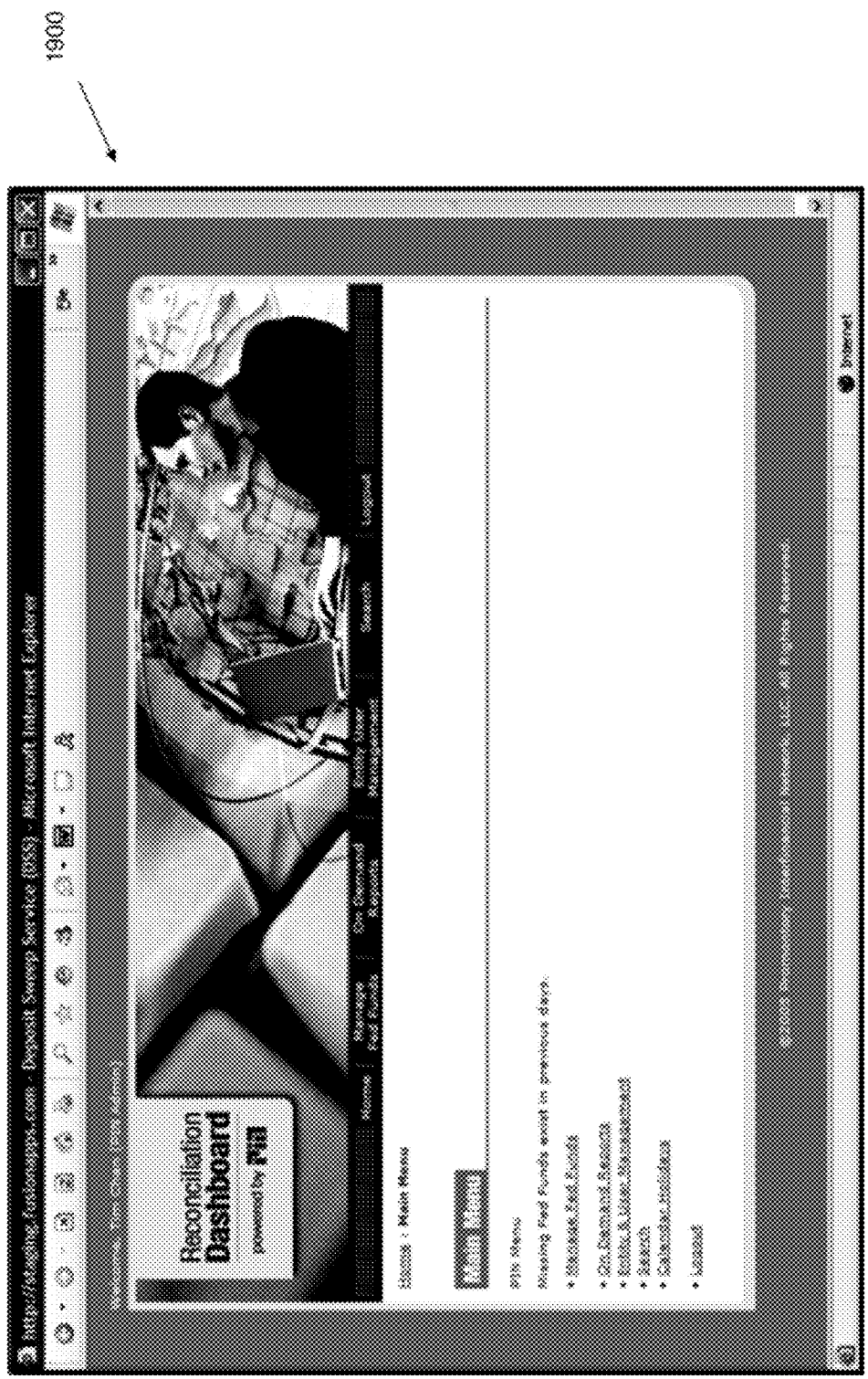
FIG. 19 is another exemplary screen shot generated by the user interface of the present invention.

Underlying the reconciliation toolkit is a series of administrative functions that are available only to a system administrator. Referring to FIG. 19, another exemplary screen shot 1900 generated by a user interface according to the present invention is shown. In accordance with an embodiment of the invention, FIG. 19 is a view of the reconciliation toolkit as presented to a system administrator.

Figure 20:
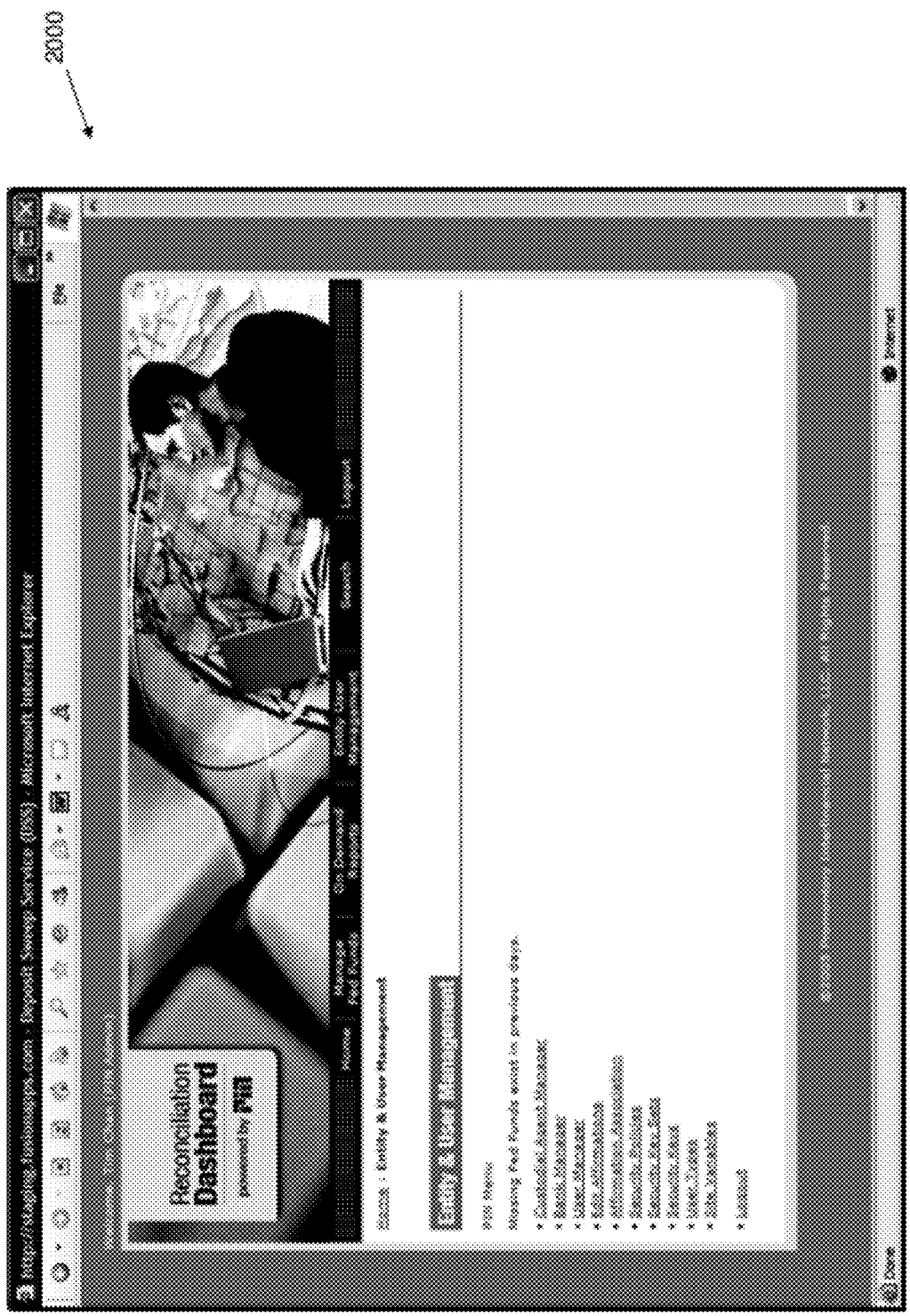
FIG. 20 is another exemplary screen shot generated by the user interface of the present invention.

FIG. 20 shows an exemplary entity and user management screen shot 2000 generated by a user interface according to the present invention. Here the various parameters of the reconciliation toolkit can be configured.

Figure 21:
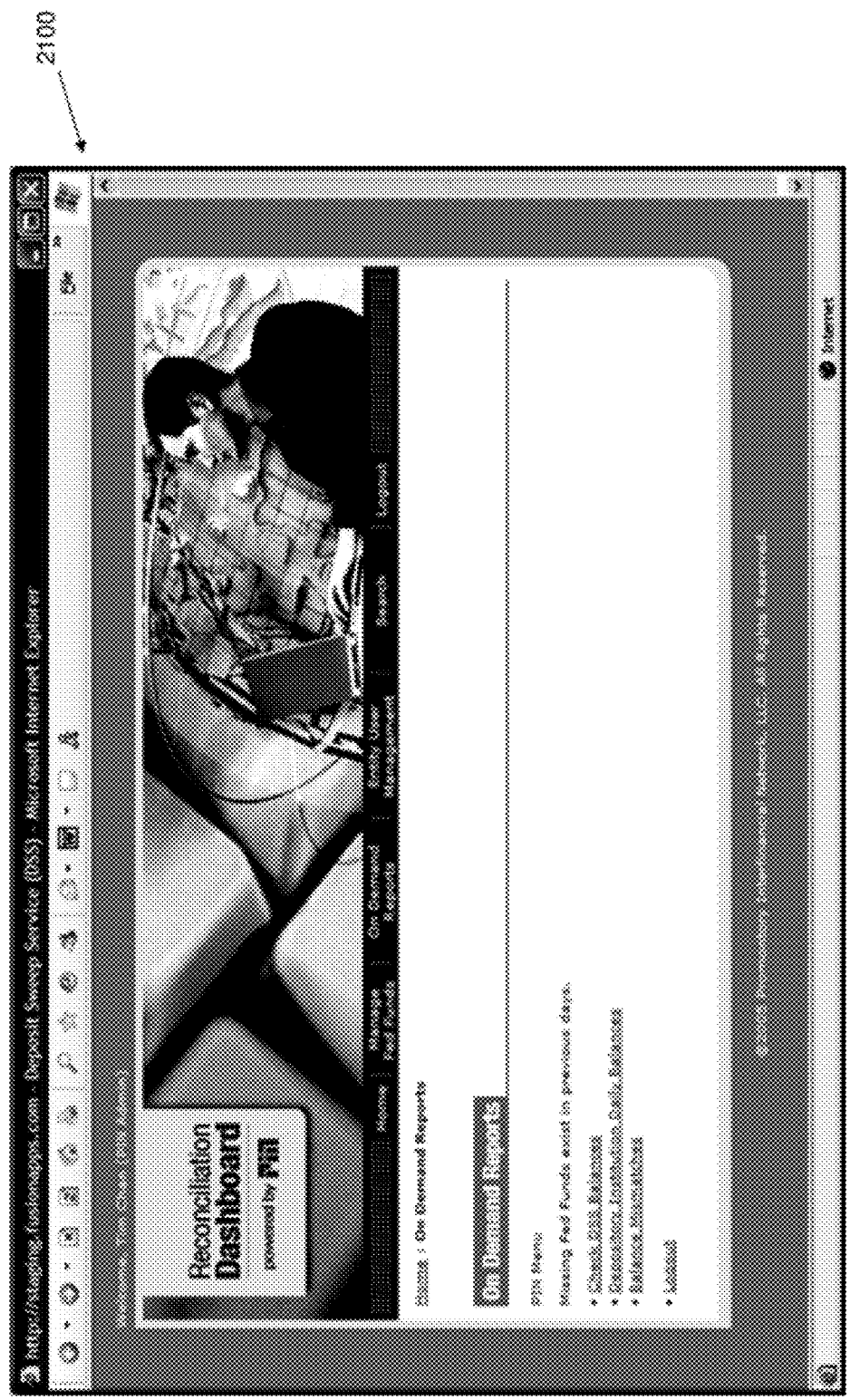
FIG. 21 is another exemplary screen shot generated by the user interface of the present invention.

On demand reports may be generated for the system administrator. FIG. 21 shows an exemplary administrator reporting screen shot 2100 generated by a user interface according to the present invention. The system administrator preferably knows immediately about error conditions in the system through a robust reporting and email notification system, so that they can be working on a resolution to problems before they are brought to the custodial agent's attention. For example, as shown in FIG. 21, the system administrator is being "nagged" by a critical error condition, a Fed Funds Rate report is missing.

Figure 22:
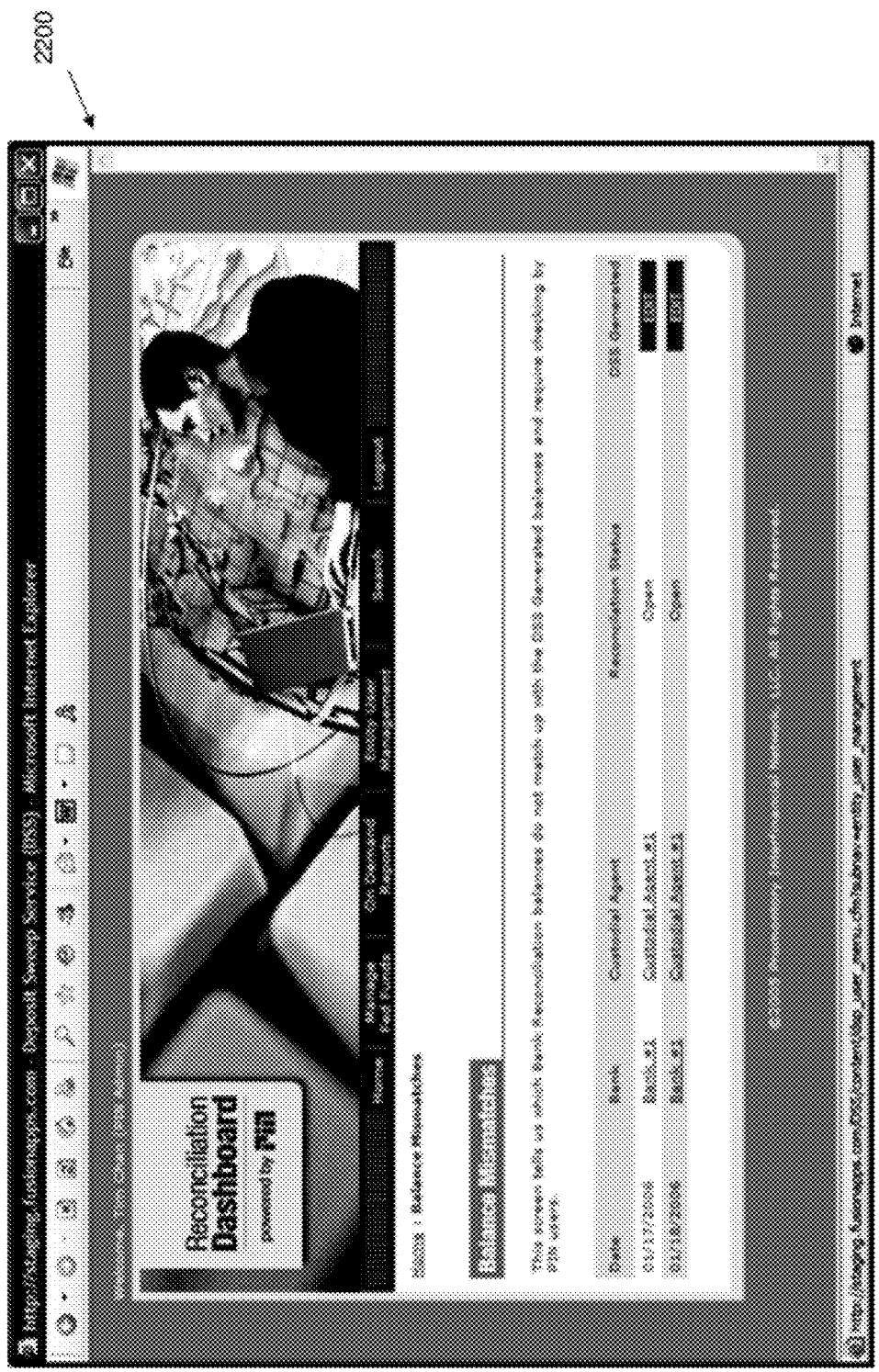
FIG. 22 is another exemplary screen shot generated by the user interface of the present invention.

FIG. 22 shows an exemplary balance mismatch reporting screen shot 2200 generated by a user interface according to the present invention. Potential balance mismatches are only one such notification that is tracked by the reconciliation toolkit. In one embodiment, a system administrator may assume the role of any network bank or custodial agent to correct system problems. These actions are reflected as administrative intervention on the various audit reports.

Figure 23:
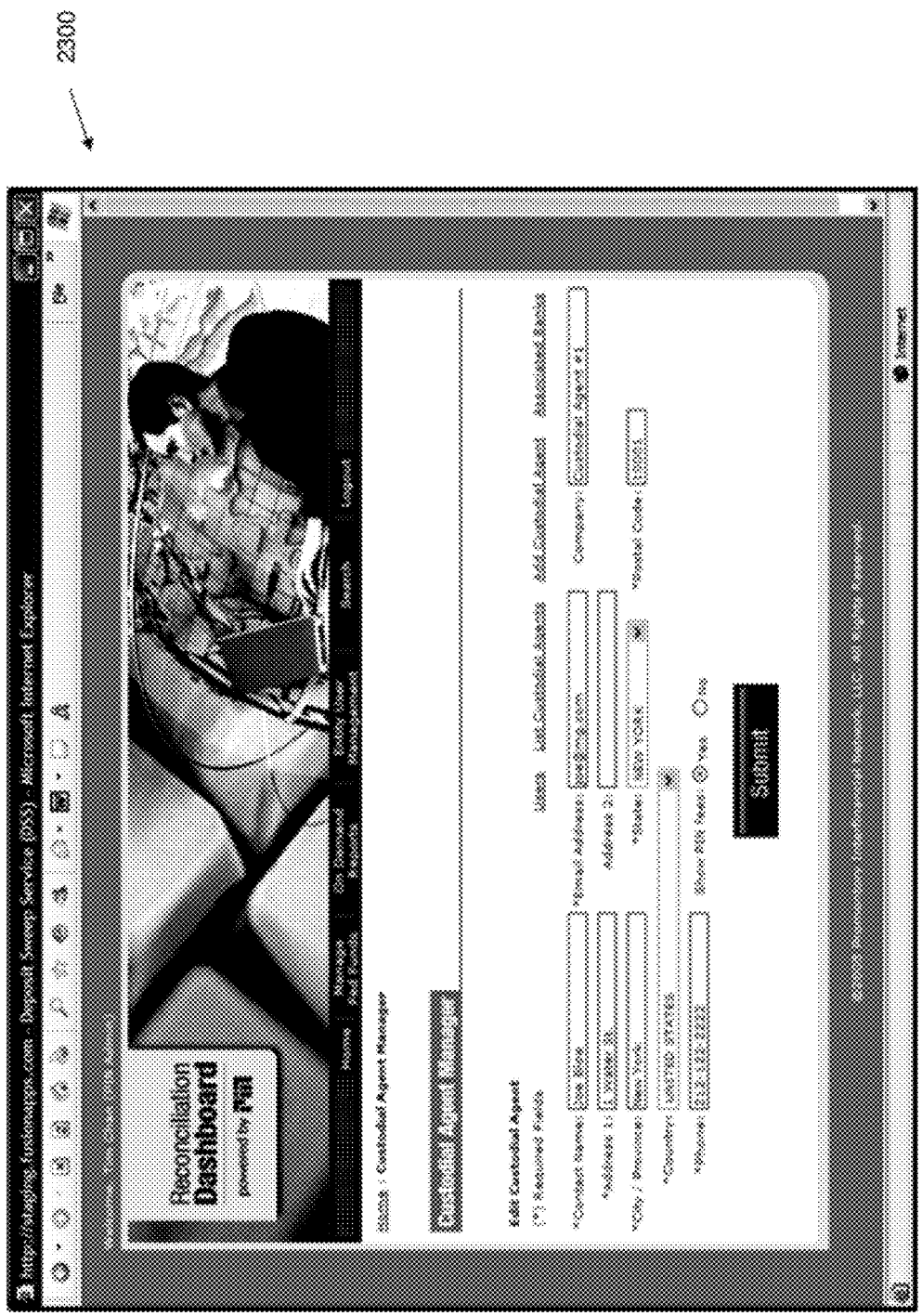
FIG. 23 is another exemplary screen shot generated by the user interface of the present invention.

The system administrator may also use the reconciliation toolkit to establish new custodial agent relationships and manage existing custodial agent relationships. FIG. 23 shows an exemplary custodial agent management screen shot 2300 generated by a user interface according to the present invention.

The present invention (i.e., components of deposit sweep arrangement 100 (e.g. back office service provider 102, deposit sweep engine 104, settlement agent 106), process 300, process 350 or any parts or functions thereof) may be implemented using hardware, software or a combination thereof and may be implemented in one or more computer systems or other processing systems. However, the manipulations performed by the present invention are often referred to herein in terms, such as comparing or identifying, which are commonly associated with mental operations performed by a human operator. No such capability of a human operator is necessary, or desirable in most cases, in any of the operations described herein which form part of the present invention. Rather, the operations are machine operations. Useful machines for performing the operation of the present invention include general purpose digital computers or similar devices, such as a computer system 2400, as shown in FIG. 24.

FIG. 24 illustrates one or more processors, such as processor 2404. Processor 2404 can be a special purpose or a general purpose digital signal processor. The processor 2404 is connected to a communications infrastructure 2406 (for example, a communication bus or network). Various software implementations are described in terms of this exemplary computer system. After reading this description, it will become apparent to a person skilled in the relevant art how to implement the invention using other computer systems and/or computer architectures.

Computer system 2400 can include a display interface 2402 that forwards graphics, text, and other data from communication infrastructure 2406 (or from a frame buffer not shown) for display on a display unit 2403.

Computer system 2400 also includes a main memory 2408, preferably random access memory (RAM), and may also include a secondary memory 2410. The secondary memory 2410 may include, for example, a hard disk drive 2412 and/or a removable storage drive 2414, representing a floppy disk drive, a magnetic tape drive, an optical disk drive, etc. The removable storage drive 2414 reads from and/or writes to a removable storage unit 2418 in a well known manner.

Removable storage unit 2418, represents a floppy disk, magnetic tape, optical disk, etc. which is read by and written to by removable storage drive 2414. As will be appreciated, the removable storage unit 2418 includes a computer usable storage medium having stored therein computer software and/or data.

In alternative implementations, secondary memory 2410 may include other similar means for allowing computer programs or other instructions to be loaded into computer system 2400. Such means may include, for example, a removable storage unit 2422 and an interface 2420. Examples of such means may include a program cartridge and cartridge interface, a removable memory chip (such as an erasable programmable read only memory (EPROM), flash memory, or programmable read only memory (PROM)) and associated socket, and other removable storage units 2422 and interfaces 2420 which allow software and data to be transferred from the removable storage unit 2422 to computer system 2400.

Computer system 2400 may also include a communications interface 2424. Communications interface 2424 allows software and data to be transferred between computer system 2400 and external devices. Examples of communications interface 2424 may include a modem, a network interface (such as an Ethernet card), a communications port, a Personal computer Memory Card International Association (PCMCIA) slot and card, wired or wireless systems, etc. Software and data transferred via communications interface 2424 are in the form of signals 2428 which may be electronic, electromagnetic, optical or other signals capable of being received by communications interface 2424. These signals 2428 are provided to communications interface 2424 via a communications path 2426. Communications path 2426 carries signals 2428 and may be implemented using wire or cable, fiber optics, a telephone line, a cellular link, a radio frequency (RF) link and/or other communications channels.

In this document, the terms "computer program medium" and "computer usable medium" are used to generally refer to media such as removable storage drive 2414, a hard disk installed in hard disk drive 2412, and signals 2428. These computer program products are means for providing software to computer system 2400.

Computer programs (also called computer control logic) are stored in main memory 2408 and/or secondary memory 2410. Computer programs may also be received via communications interface 2424. Such computer programs, when executed, enable the computer system 2400 to implement the present invention as discussed herein. In particular, the computer programs, when executed, enable the processor 2404 to implement the processes of the present invention, such as the method(s) implemented as described above. These processes may be performed automatically, or involve some form of manual intervention. Accordingly, such computer programs represent controllers of the computer system 2400.

In an embodiment where the invention is implemented using software, the software may be stored in a computer program product and loaded into computer system 2400 using removable storage drive 2414, hard drive 2412 or communications interface 2424. the control logic (software), when executed by processor 2404, causes processor 2404 to perform the functions of the invention as described herein.

In another embodiment, the invention may be implemented primarily in hardware using, for example, hardware components such as an integrated circuit (IC) customized for a particular use, also known as application specific integrated circuits (ASICs). Implementation of the hardware state machine so as to perform the functions described herein will be apparent to persons skilled in the relevant art.

In yet another embodiment, the invention is implemented using a combination of both hardware and software.

The invention is also directed to computer products (also called computer program products) comprising software stored on any computer useable medium. Such software, when executed in one or more data processing devices, causes the data processing device to operate as described herein. Embodiments of the invention employ any computer useable or readable medium, known now or in the future. Examples of computer useable mediums include, but are not limited to, primary storage devices (e.g., any type of random access memory), secondary storage devices (e.g., hard drives, floppy disks, CD ROMS, DVD ROMS, ZIP disks, tapes, magnetic storage devices, optical storage devices, MEMS, nanotechnological storage device, etc.), and communication mediums (e.g., wired and wireless communications networks, local area networks, wide area networks, intranets, etc.). It is to be appreciated that the embodiments described herein can be implemented using software, hardware, firmware, or combinations thereof.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. Thus, the present invention should not be limited by any of the above described exemplary embodiments, but should be defined only in accordance with the following claims and their equivalents.

In addition, it should be understood that the figures and screen shots illustrated in the attachments, which highlight the functionality and advantages of the present invention, are presented for example purposes only. The architecture of the present invention is sufficiently flexible and configurable, such that it may be utilized (and navigated) in ways other than that shown in the accompanying figures.

Further, the purpose of the foregoing Abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract is not intended to be limiting as to the scope of the present invention in any way.

What is claimed is:

1. A computer-implemented method for reconciling a plurality of custodial accounts held at a plurality of depository institutions by a custodial agent, wherein funds in said custodial accounts are deposited in the aggregate from individual accounts belonging to a plurality of individuals, comprising:

receiving electronic individual account transaction data relating to said individual accounts;

deriving, with one or more processors, custodial account balance data relating to said custodial accounts from said individual account transaction data;

receiving electronic custodial account balance data relating to said custodial accounts from said depository institutions;

comparing, with said one or more processors, said custodial account balance data received from said depository institutions against said derived custodial account balance data;

identifying discrepancies between said custodial account balance data received from said depository institutions and said derived custodial account balance data;

identifying a prospective write-off in the amount of one or more of said discrepancies; and prompting said custodial agent to indicate whether said custodial agent accepts said prospective write-off.

2. The method according to claim 1, further comprising: allowing said custodial agent to not accept said prospective write-off.

3. The method according to claim 1, wherein said prospective write-off is an offset against an account.

4. The method according to claim 3, wherein said prospective write-off is an offset against a fee charged to one or more of said depository institutions by said custodial agent.

5. The method according to claim 1, wherein said custodial accounts are deposit sweep accounts.

6. The method according to claim 1, wherein said plurality of depository institutions are in a network of banks at which deposits are held by the custodial agent.

7. The method according to claim 1, wherein said individual account transaction data comprises daily deposit and withdrawal activity for each of said individual accounts.

8. The method according to claim 1, wherein said custodial account balance data received from said depository institutions comprises principal balance and interest accrued for each of said custodial accounts.

9. A computer-implemented method for auditing a plurality of custodial accounts held at a plurality of depository institutions by a custodial agent, wherein funds in said custodial accounts are deposited in the aggregate from individual accounts belonging to a plurality of individuals, comprising:

deriving, with one or more processors, custodial account balance data relating to said custodial accounts from individual account transaction data relating to said individual accounts;

comparing, with said one or more processors, said derived custodial account balance data against custodial account balance data received from said depository institutions;

identifying discrepancies between said received custodial account balance data and said derived custodial account balance data; and displaying said discrepancies.

10. The method according to claim 9, further comprising: identifying a prospective write-off in the amount of one or more of said discrepancies.

11. The method according to claim 10, further comprising: prompting said custodial agent to indicate whether said custodial agent accepts said prospective write-off.

12. The method according to claim 11, further comprising: allowing said custodial agent to not accept said prospective write-off.

13. The method according to claim 10, wherein said prospective write-off is an offset against an account.

14. The method according to claim 13, wherein said prospective write-off is an offset against a fee charged to one or more of said depository institutions by said custodial agent.

15. The method according to claim 9, wherein said individual account transaction data comprises net daily deposit activity and net daily withdrawal activity for said customer accounts.

16. The method according to claim 9, wherein said depository institutions are in a network of banks at which deposits are held by the custodial agent.

17. The method according to claim 9, wherein funds in said individual accounts are disaggregated and then reaggregated in said custodial accounts.

18. The method according to claim 9, wherein said custodial account balance data received from said depository institutions comprises principal balance and interest accrued for each of said custodial accounts.

19. A computer-implemented method for reconciling a balance of funds in a plurality of custodial accounts held at a plurality of depository institutions by a custodial agent, wherein funds in said custodial accounts are deposited in the aggregate from individual accounts belonging to a plurality of individuals, comprising:

receiving electronic individual account transaction data relating to said individual accounts;

deriving, with one or more processors, expected balance of funds data for said custodial accounts from said individual account transaction data;

receiving balance of funds data for said custodial accounts from said depository institutions;

comparing, with said one or more processors, said expected balance of funds data for said custodial accounts against said received balance of funds data;

identifying discrepancies between said expected balance of funds data and said received balance of funds data;

identifying a prospective write-off;

displaying said prospective write-off; and prompting said custodial agent to indicate whether said custodial agent accepts said prospective write-off.

20. The method according to claim 19, wherein said individual account transaction data comprises net aggregated deposits to said custodial accounts from said individual accounts and net aggregated withdraws from said custodial accounts to said individual accounts.

21. The method according to claim 19, wherein said balance of funds data comprises principal and interest data.

22. The method according to claim 19, wherein said balance of funds data comprises principal, interest and fee data.

23. The method according to claim 19, wherein said custodial account is an insured deposit account.

* * * * *